(12) United States Patent
Asuna et al.

(10) Patent No.: US 7,819,732 B2
(45) Date of Patent: Oct. 26, 2010

(54) IMAGE GENERATION SYSTEM, PROGRAM, AND INFORMATION STORAGE MEDIUM

(75) Inventors: Kouji Asuna, Yokohama (JP); Takashi Otani, Yokohama (JP)

(73) Assignee: Namco Bandai Games, Inc., Tokyo (JP)

( * ) Notice: Subject to any disclaimer, the term of this patent is extended or adjusted under 35 U.S.C. 154(b) by 772 days.

(21) Appl. No.: 11/802,397

(22) Filed: May 22, 2007

(65) Prior Publication Data

US 2007/0287517 A1   Dec. 13, 2007

(30) Foreign Application Priority Data

May 25, 2006  (JP) ............................... 2006-145846

(51) Int. Cl.
*G06F 17/00* (2006.01)

(52) U.S. Cl. .......................................................... 463/7

(58) Field of Classification Search .................... 463/7; 273/269–271
See application file for complete search history.

(56) References Cited

U.S. PATENT DOCUMENTS

| | | | | |
|---|---|---|---|---|
| 5,909,875 A | * | 6/1999 | Weingardt | 273/269 |
| 5,935,002 A | * | 8/1999 | Falciglia | 463/19 |
| 6,079,710 A | * | 6/2000 | Brown | 273/269 |
| 7,243,131 B1 | * | 7/2007 | Inoue | 709/208 |
| 2005/0188058 A1 | * | 8/2005 | Inoue | 709/219 |
| 2005/0193126 A1 | * | 9/2005 | Inoue | 709/228 |
| 2005/0198214 A1 | * | 9/2005 | Inoue | 709/219 |

FOREIGN PATENT DOCUMENTS

| | | |
|---|---|---|
| JP | B2 2775334 | 5/1998 |
| JP | A 2005-334451 | 12/2005 |

\* cited by examiner

*Primary Examiner*—Ronald Laneau
(74) *Attorney, Agent, or Firm*—Oliff & Berridge, PLC

(57) ABSTRACT

An image generation system performs a specific pattern determination process of determining the combination pattern of a puzzle block and other puzzle blocks each time the placement of the puzzle block in a display area is determined, and setting an erasing target block when a specific pattern has been formed, and a chain determination process of determining whether or not a predetermined condition is satisfied after the erasing target block has been set, and repeatedly performs the chain determination process until the predetermined condition becomes not satisfied in the chain determination process. The image generation system performs an erasing process of erasing the erasing target block from a game space when the predetermined condition becomes not satisfied in the chain determination process.

26 Claims, 18 Drawing Sheets

FIG.2
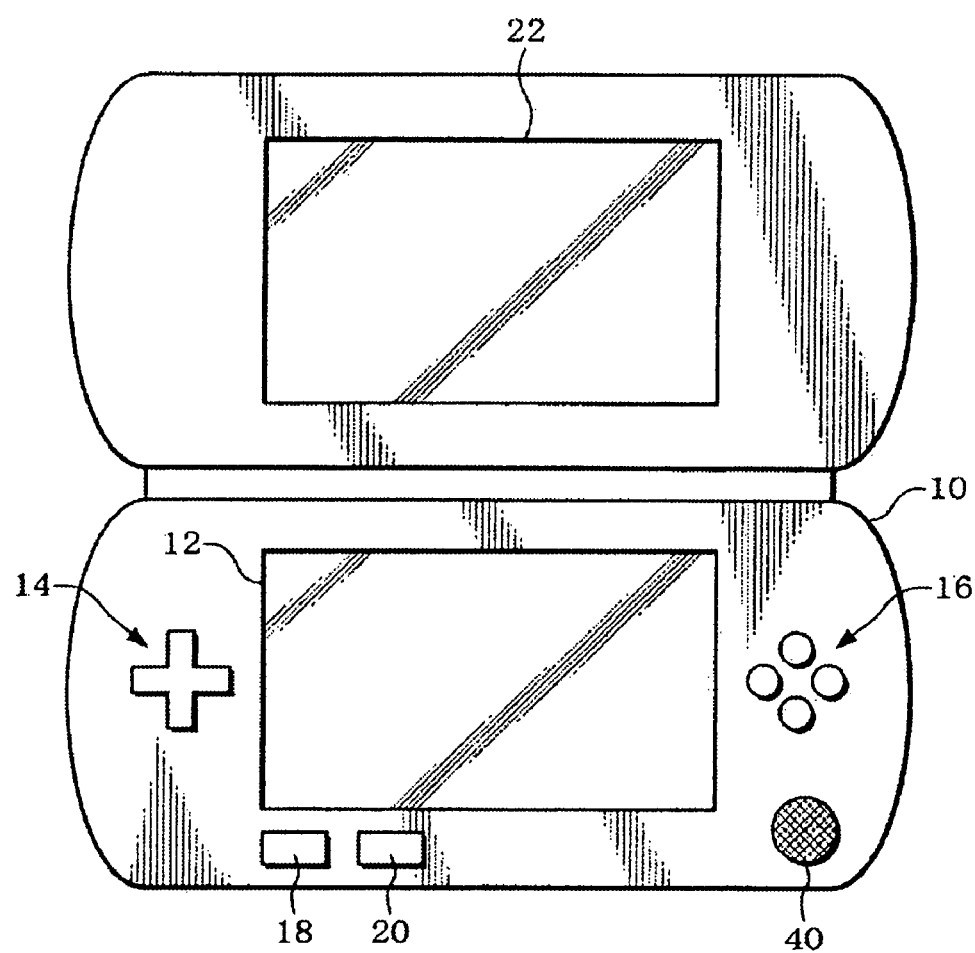
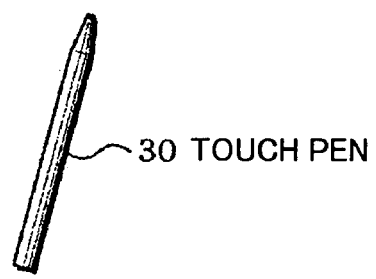

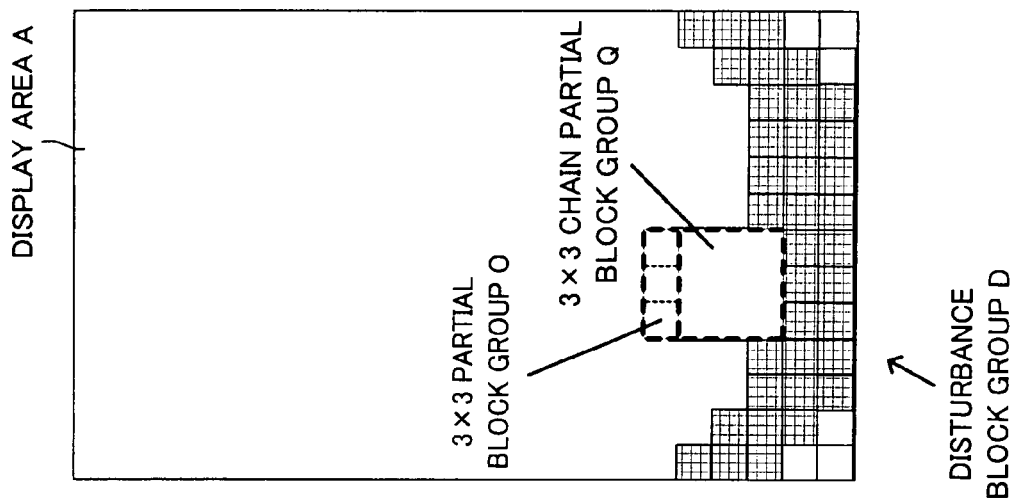
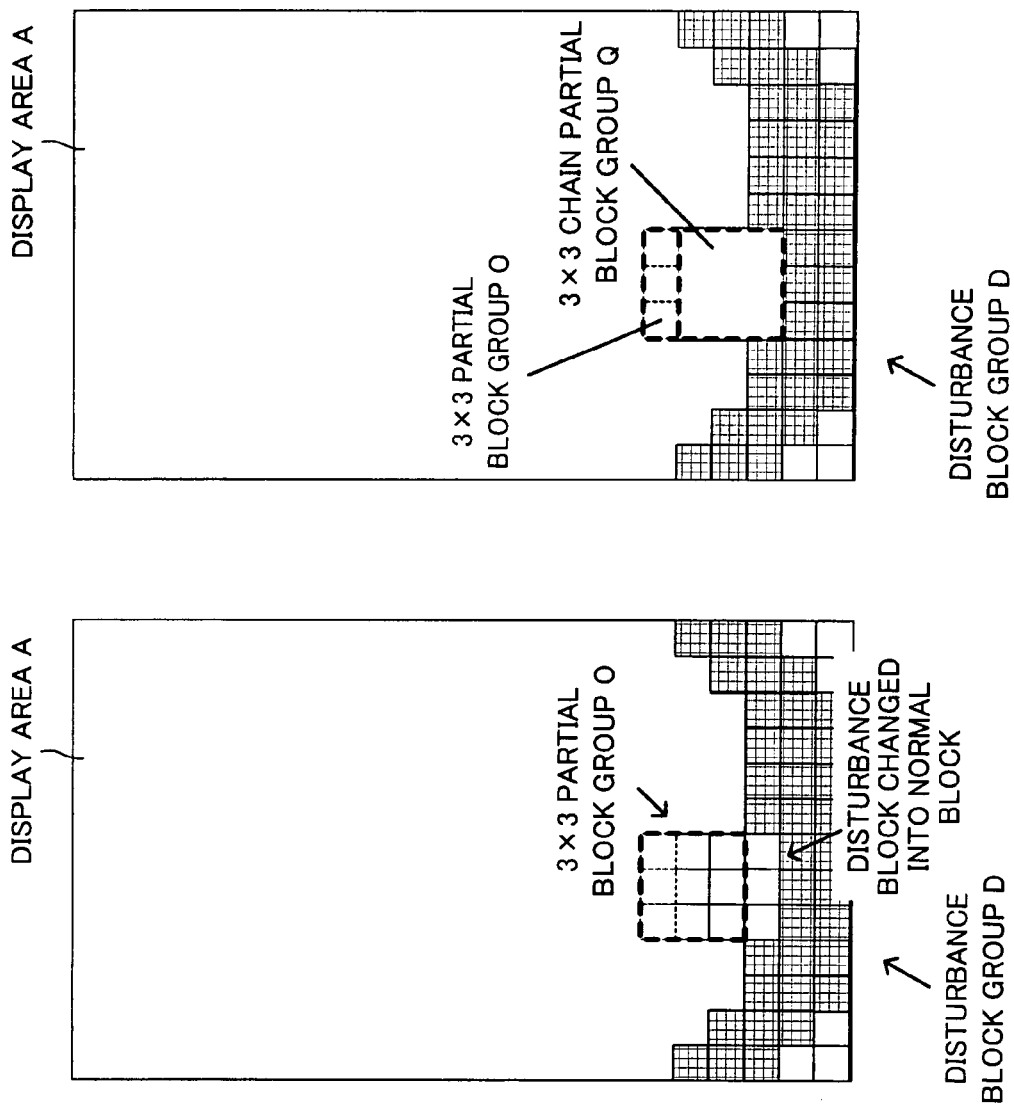
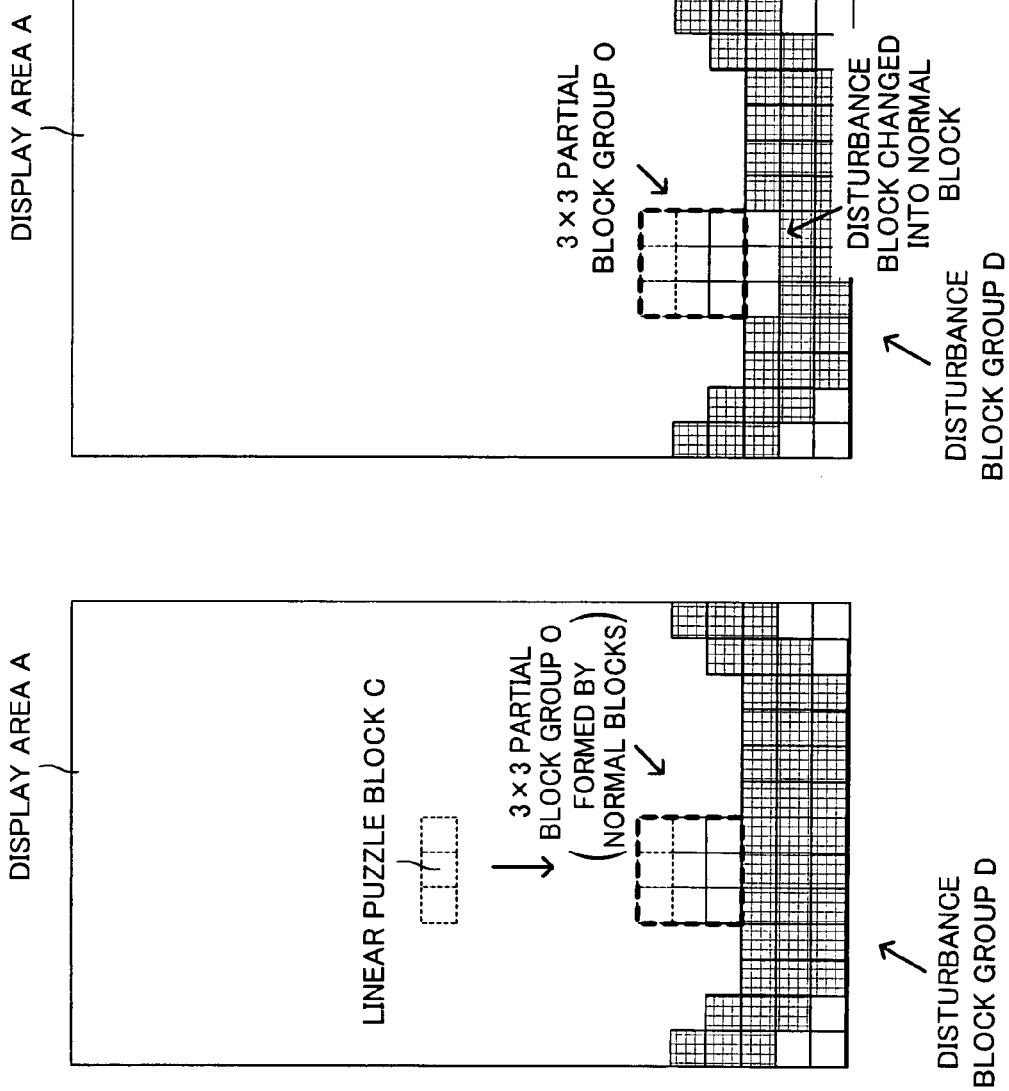

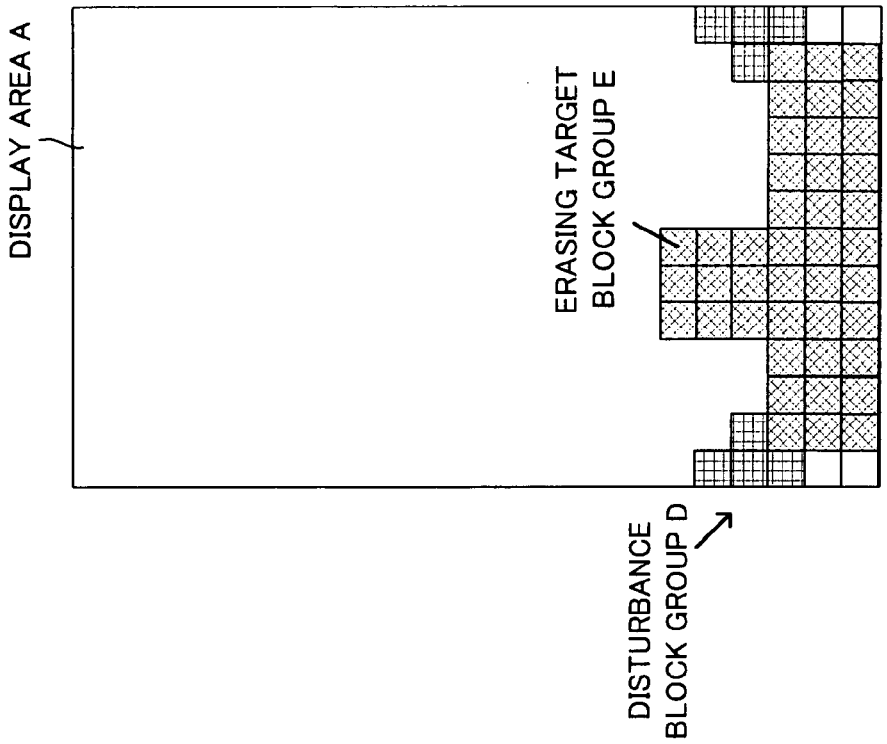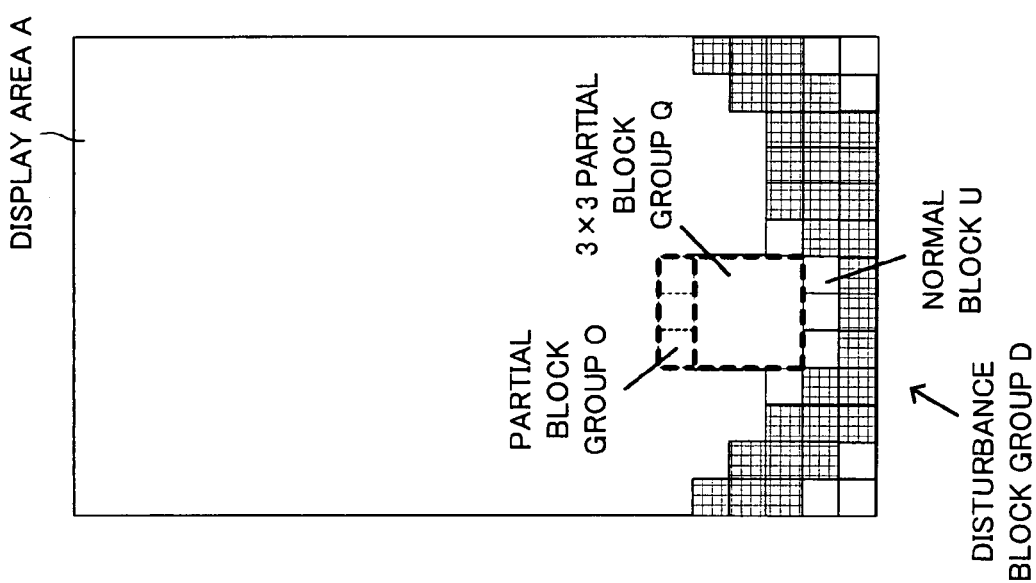

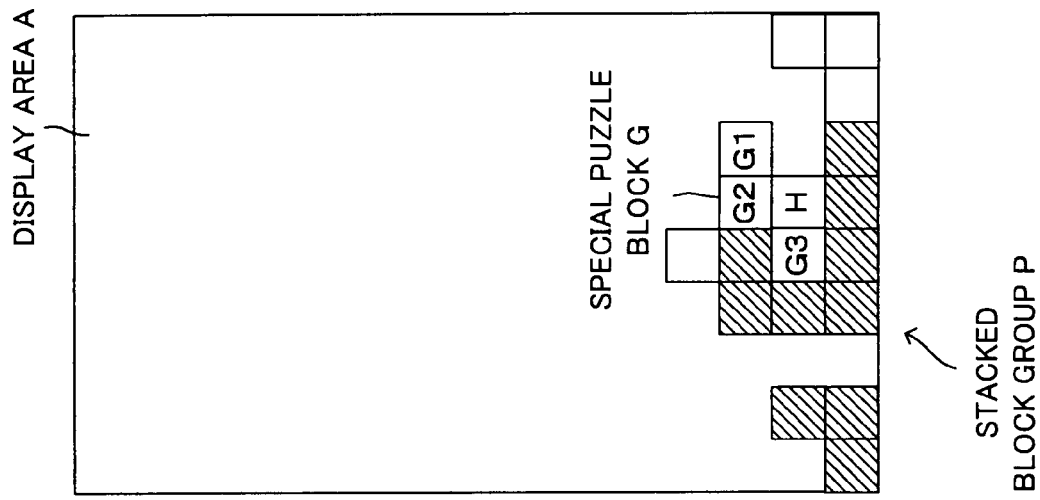
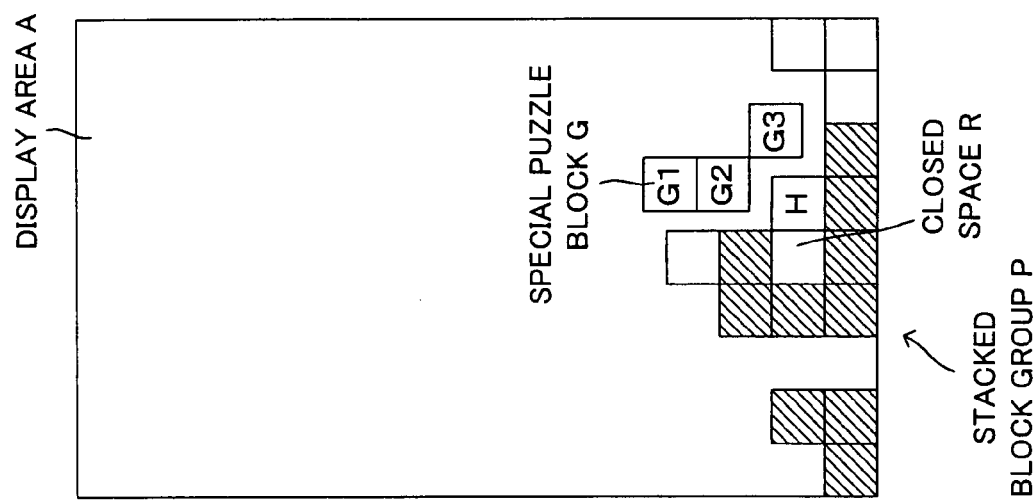

IMAGE GENERATION SYSTEM, PROGRAM, AND INFORMATION STORAGE MEDIUM

Japanese Patent Application No. 2006-145846, filed on May 25, 2006, is hereby incorporated by reference in its entirety.

BACKGROUND OF THE INVENTION

The present invention relates to an image generation system, a program, and an information storage medium.

In recent years, a puzzle game has been known which allows the player to combine a puzzle block (objects) appearing on a display device with other puzzle blocks to form an object group, and erases the objects based on a predetermined pattern (placement conditions) of the object group.

In this puzzle game, the player causes sideways movement or rotation of the puzzle block moving downward in a rectangular display area extending in the vertical direction by operating an operation button and the like to form a specific placement pattern together with other puzzle blocks. When the placement pattern coincides with a specific pattern, the puzzle blocks forming the pattern are erased. This puzzle game generally uses a pattern in which a row extending sideways in the display area is filled with the blocks as the specific pattern.

A number of products have been developed from this type of puzzle game. For example, a game device is known which provides a game full of variety and improves the player's interest by incorporating various unexpected events into the game using a puzzle block which cannot be operated by the player (e.g. Japanese Patent No. 2775334). A game program is also known which improves the player's interest by varying the erasing timing of the object group to provide the game with elements of surprise (e.g. JP-A-2005-3334451).

The above game device or game program interestingly varies the game by unexpectedly changing the puzzle block erasing timing or the like, but lacks an amusing element regarding the puzzle block erasing process. Accordingly, the above game device or game program has not changed the essential element of this type of puzzle game regarding the puzzle block erasing process.

SUMMARY

According to a first aspect of the invention, there is provided a program controlling a game system which controls placement of objects in a game space and erases at least part of the objects based on a placement pattern of the objects, the program causing a computer to function as:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

According to a second aspect of the invention, there is provided a program controlling a game system which controls placement of objects in a game space and erases at least part of the objects based on a placement pattern of the objects, the program causing a computer to function as:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space within a predetermined period of time after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

According to a third aspect of the invention, there is provided a computer-readable information storage medium storing any of the above-described programs.

According to a fourth aspect of the invention, there is provided an image generation system for a game system which controls placement of objects in a game space and erases at least part of the objects based on a placement pattern of the objects, the image generation system comprising:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

According to a fifth aspect of the invention, there is provided an image generation system for a game system which controls placement of objects in a game space and erases at least part of the objects based on a placement pattern of the objects, the image generation system comprising:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space within a predetermined period of time after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

BRIEF DESCRIPTION OF THE SEVERAL VIEWS OF THE DRAWING

FIG. 2 is an outside view of a game system according to one embodiment of the invention.

FIGS. 10A to 10C are views illustrative of a disturbance block chain determination process of an image generation system according to one embodiment of the invention.

FIGS. 11A and 11B are views illustrative of a disturbance block chain determination process of an image generation system according to one embodiment of the invention.

FIGS. 12A and 12B are views illustrative of a puzzle block rotation control process of an image generation system according to one embodiment of the invention.

DETAILED DESCRIPTION OF THE EMBODIMENT

Figure 1:
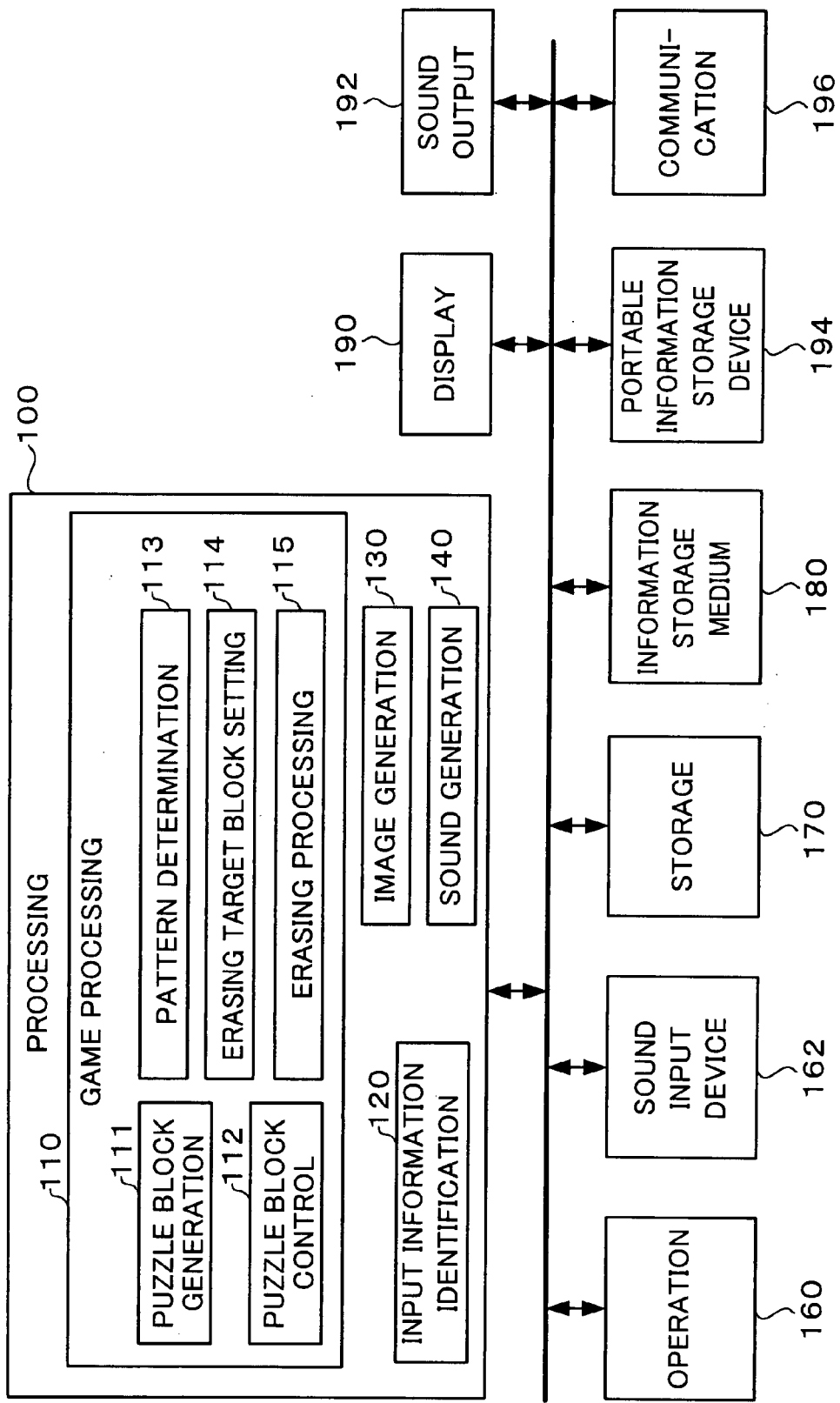
FIG. 1 is a functional block diagram of a game system according to one embodiment of the invention.

An objective of the invention is to provide an image generation system, a program, and an information storage medium which improve the player's interest by adding an element of erasing a number of objects at one time depending on the player's skill in a game system which controls the placement of an object in a game space and erases the object based on the placement pattern of the objects.

(1) According to one embodiment of the invention, there is provided an image generation system for a game system which controls placement of objects in a game space and erases at least part of the objects based on a placement pattern of the objects, the image generation system comprising:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

According to one embodiment of the invention, there is provided a program causing a computer to function as the above-described sections. According to one embodiment of the invention, there is provided a computer-readable information storage medium storing the program.

According to the above image generation system, program, or information recording medium, the erasing processing section determines that the predetermined conditions have not been satisfied when the object group including the object positioned after the erasing target object has been set does not form the predetermined placement pattern, and does not erase the erasing target object from the game space when the predetermined conditions have been satisfied.

Therefore, according to the above image generation system, program, or information recording medium, when the predetermined placement pattern is continuously formed each time the object is positioned, the number of erasing target objects is increased without erasing the erasing target objects each time the object is positioned, and the erasing target objects are erased at one time at a predetermined timing (e.g. when the placement pattern has not been continuously formed, whereby the predetermined conditions have not been satisfied).

Therefore, the above image generation system, program, or information recording medium can improve the player's interest by adding an amusing element to the object erasing process by giving an advantage to the player who has erased a number of objects at one time.

Note that whether or not the object group forms the predetermined placement pattern may be determined by the placement (number, shape, or positional relationship) of the object group, or may be determined by the placement (number, shape, or positional relationship) when focusing on certain properties (e.g. color and pattern) of the object group.

(2) According to one embodiment of the invention, there is provided an image generation system for a game system which controls placement of objects in a game space and erases at least part of the objects based on a placement pattern of the objects, the image generation system comprising:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space within a predetermined period of time after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

According to one embodiment of the invention, there is provided a program causing a computer to function as the above-described sections. According to one embodiment of the invention, there is provided a computer-readable information storage medium storing the program.

According to the above image generation system, program, or information recording medium, the erasing processing section determines that the predetermined conditions have been satisfied when the object group including the object positioned within the predetermined period of time after the erasing target object has been set forms the predetermined placement pattern, determines that the predetermined conditions have not been satisfied when the object group including the object positioned within the predetermined period of time does not form the predetermined placement pattern, and does not erase the erasing target object from the game space when the predetermined conditions have been satisfied.

According to the above image generation system, program, or information recording medium, when the predetermined placement pattern is continuously formed within the predetermined period of time each time the period of time until the predetermined period of time expires starts to be measured, the number of erasing target objects can be increased without erasing the erasing target objects each time the object is positioned, and the erasing target objects can be erased at one time at a predetermined timing (e.g. when the placement pattern has not been continuously formed, whereby the predetermined conditions have not been satisfied).

Therefore, the above image generation system, program, or information recording medium can improve the player's interest by adding an amusing element to the object erasing process by giving an advantage to the player who has erased a number of objects at one time.

Note that whether or not the object group forms the predetermined placement pattern may be determined by the placement (number, shape, or positional relationship) of the object group, or may be determined by the placement (number, shape, or positional relationship) when focusing on certain properties (e.g. color and pattern) of the object group.

(3) In each of the above image generation system, program, and information storage medium, the placement processing section may integrally control at least one of movement and rotation of connected object groups each of which is formed by connecting part of the objects based on the operation input of the player, and position the objects forming the connected object groups in the game space.

According to this embodiment, the player's interest can be improved by adding an amusing element to the object erasing process by giving an advantage to the player when erasing a number of objects at one time in a game system in which the connected object group is positioned in the game space and the object is erased in units of objects forming the connected object group.

(4) In each of the above image generation system, program, and information storage medium, the placement pattern determination section may determine whether or not the objects including the connected object groups positioned in the game space form a predetermined placement pattern; and the erasing processing section may determine that the predetermined condition is not satisfied when the objects including additional connected object groups newly positioned in the game space after the erasing target objects have been set do not form a predetermined placement pattern.

According to this embodiment, the player's interest can be improved by adding an amusing element to the object erasing process by giving an advantage to the player when erasing a number of objects at one time in a game system in which the connected object group is positioned in the game space and the connected object group is integrally erased.

(5) In each of the above image generation system, program, and information storage medium, the placement pattern determination section may determine whether or not the objects including the connected object groups positioned in the game space form a predetermined placement pattern;

the erasing processing section may determine that the predetermined condition is satisfied when the objects including additional connected object groups newly, positioned in the game space within a predetermined period of time after the erasing target objects have been set form a predetermined placement pattern; and the erasing processing section may determine that the predetermined condition is not satisfied when the objects including the additional connected object groups do not form the predetermined placement pattern.

According to this embodiment, the player's interest can be improved by adding an amusing element to the object erasing process by giving an advantage to the player when erasing a number of objects at one time in a game system in which the connected object group is positioned in the game space and the connected object group is integrally erased.

(6) In each of the above image generation system, program, and information storage medium, after the predetermined condition has been determined to be satisfied, the erasing processing section may start to measure another predetermined period of time which is determined by shortening the predetermined period of time, and determine again whether or not the predetermined condition is satisfied.

According to this configuration, the above image generation system, program, or information recording medium can improve the player's interest by increasing the amusing element relating to the object erasing process by reducing the predetermined period of time upon remeasurement.

(7) In each of the above image generation system, program, and information storage medium, the erasing processing section may shorten the predetermined period of time based on at least one of the number of times that the specific condition is satisfied, the number of times that the specific condition is successively satisfied, the number of the erasing target objects, a degree of difficulty of a game, and a period of time elapsed after starting the game.

According to this configuration, since the above image generation system, program, or information recording medium can change the predetermined period of time to be reduced based on at least one of the generation count of the predetermined placement pattern, the continuous generation count of the predetermined placement pattern, the number of erasing target objects, the degree of difficulty of the game, and the period of time elapsed after starting the game, the player's interest can be maintained by preventing the game from becoming monotonous by reducing the predetermined period of time depending on the game progress conditions, for example.

(8) In each of the above image generation system, program, and information storage medium, the erasing processing section may erase part of the objects having a predetermined positional relationship with the erasing target objects together with the erasing target objects, when performing the erasing process.

According to this configuration, the above image generation system, program, or information recording medium can maintain the player's interest regarding the game progress conditions by facilitating the game by facilitating the puzzle solution method in addition to complicating the game by erasing the object positioned under the erasing target object in the game space together with the erasing target object.

(9). In each of the above image generation system, program, and information storage medium, the erasing processing section may cancel a connection relationship of objects forming at least part of the connected object groups stacked over the erasing target objects in the game space, when performing the erasing process.

According to this configuration, the above image generation system, program, or information recording medium can maintain the player's interest regarding the game progress conditions by facilitating the game by facilitating the puzzle solution method by canceling the connection relationship of the objects forming the stacked connected object group and changing the relative relationship when stacking the objects.

(10) In each of the above image generation system, program, and information storage medium, the placement processing section may generate and position an inoperable object which cannot be operated by the player in the game space based on a predetermined event.

According to this configuration, since the above image generation system, program, or information recording medium can incorporate a competitive element regarding the object erasing process when the player plays a match against another player or a virtual player by increasing the number of objects in the game space based on an event in the game process of another player or a virtual player, such as an event in which another player has erased the block, interest differing from that in a single-player mode can be provided.

A predetermined event may also be generated under predetermined conditions or randomly in a single-player mode other than a match game (e.g. multiplayer mode or a match against a computer).

(11) In each of the above image generation system, program, and information storage medium, the placement pattern determination section may determine whether or not the objects positioned in the game space and including normal objects other than the inoperable object include objects forming a predetermined placement pattern.

(12) Each of the above image generation system, program, and information storage medium may further causing the computer to function as:

an object change section which changes the inoperable object having a predetermined positional relationship into a normal object when the predetermined condition is satisfied.

According to this configuration, since the above image generation system, program, or information recording medium can maintain the player's interest regarding the game progress conditions when the player plays a match against another player or a virtual player by facilitating the puzzle solution method when increasing the number of objects instead of merely incorporating a competitive element by increasing the number of objects in the game space based on the game progress conditions of another player or the like.

(13) In each of the above image generation system, program, and information storage medium, when the placement processing section controls rotation of an operation target object based on a positional relationship with other objects, the placement processing section may rotatably control the operation target object even if the operation target object interferes with other objects during rotation, as long as the operation target object after the rotation does not interfere with other objects.

According to this configuration, the above image generation system, program, or information recording medium can maintain interest throughout the entire game by facilitating the puzzle solution method such as enabling at least one of the objects to be disposed in a space enclosed by the objects or providing additional player interest in the operation.

(14) Each of the above image generation system, program, and information storage medium may further causing the computer to function as:

an object generation section which generates the connected object groups in each of which objects are connected to share only a vertex with each other in the game space so that the connected object groups can be operated by the player, when the game space is a two-dimensional space.

According to this configuration, the above image generation system, program, or information recording medium can maintain interest throughout the entire game by facilitating the puzzle solution method such as enabling at least one of the objects to be disposed in a space enclosed by the objects or providing player interest in the operation.

(15) Each of the above image generation system, program, and information storage medium may further causing the computer to function as:

an object generation section which generates the connected object groups in each of which objects are connected to share only a side with each other in the game space so that the connected object groups can be operated by the player, when the game space is a three-dimensional space.

According to this configuration, the above image generation system, program, or information recording medium can maintain interest throughout the entire game by facilitating the puzzle solution method such as enabling at least one of the objects to be disposed in a space enclosed by the objects or providing player interest in the operation.

Some embodiments of the invention will be described below. Note that the embodiments described below do not in any way limit the scope of the invention laid out in the claims herein. In addition, not all of the elements of the embodiments described below should be taken as essential requirements of the invention.

1. Configuration

An image generation system (game system) according to one embodiment of the invention is described below with reference to FIG. 1. FIG. 1 is an example of a functional block diagram of the image generation system according to this embodiment. Note that some of the elements (sections) shown in FIG. 1 may be omitted from the image generation system according to this embodiment.

An operation section 160 allows the player to input operation data. The function of the operation section 160 may be implemented by a lever, a direction indication key, a button, or the like.

A sound input device 162 allows the player to input sound such as voice or a clap. The function of the sound input device 162 may be implemented by a microphone or the like.

A storage section 170 serves as a work area for a processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a memory card, a hard disk, a memory (ROM), or the like.

The processing section 100 performs various processes according to this embodiment based on a program (data) stored in the information storage medium 180. Specifically, a program for causing a computer to function as each section according to this embodiment (program for causing a computer to perform the process of each section) is stored in the information storage medium 180.

A display 190 displays an image generated according to this embodiment. The display 190 may have a single-display structure or a double-display structure. When the display 190 has a single-display structure, a first image and a second image may be output to one display either simultaneously or alternately. When the display 190 has a double-display structure including a first display and a second display, the first image may be displayed on the first display, and the second image may be displayed on the second display.

The display 190 may be configured to function as an operation input section for the player to operate the game using a touch panel display. When the display 190 has a double-display structure, one of the displays may be configured as a touch panel display. The touch panel display is formed using a resistive film method (four-wire type or five-wire type), an electrostatic capacitive coupling method, an ultrasonic surface acoustic wave method, an infrared scanning method, or the like.

When the display 190 is a touch panel display, the display section may be implemented by a liquid crystal display device (LCD), a CRT, an organic EL display, or the like, and displays an image generated according to this embodiment.

A sound output section 192 outputs sound generated according to this embodiment. The function of the sound output section 192 may be implemented by a speaker, a headphone, or the like.

A portable information storage device 194 stores player's personal data, game save data, and the like. As examples of the portable information storage device 194, a memory card, a portable game system, and the like can be given. The communication section 196 performs various types of control for communicating with the outside (e.g. host device or another game system). The function of the communication section 196 may be implemented by hardware such as a processor or a communication ASIC, a program, and the like.

The program (data) for causing a computer to function as each section according to this embodiment may be distributed to the information storage medium 180 (storage section 170) from an information storage medium included in a host device (server) through a network and the communication section 196. Use of the information storage medium of the host device (server) may also be included within the scope of this embodiment.

The processing section 100 (processor) performs a game calculation process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g. CPU or DSP) or an ASIC (e.g. gate array) and a program.

The processing section 100 includes a game processing section 110, an input information. identification section 120, an image generation section 130, and a sound generation section 140.

The game processing section 110 performs a game calculation process for generating a game image and game sound. The game calculation process includes a process of determining the game content and a game mode, a process of starting a game when game start conditions have been satisfied, a process of proceeding with a game, a process of calculating a game parameter (game result) which changes accompanying game play, a process of terminating a game when game finish conditions have been satisfied, and the like.

The game processing section 110 basically performs various game calculation processes including sequentially generating various connected object groups (formed by connecting a plurality of objects; hereinafter called "puzzle block") from the top in a rectangular display area (game space) extending in the vertical direction, causing the puzzle block to fall downward at a predetermined speed while controlling the movement (e.g. sideways movement or rotation) of the puzzle block based on input information (e.g. identified input command), a program, and the like, and stacking the puzzle block at the bottom of the display area or over the puzzle block which has been stacked.

The game processing section 110 erases predetermined objects based on a pattern formed by the puzzle block and other objects which have been stacked each time the puzzle block is stacked (i.e. each time the placement of the puzzle block in the display area including the orientation due to rotation is determined), and performs the process of proceeding with the game until the puzzle block reaches the top of the display area (i.e. puzzle block generation region).

In particular, when the object group positioned in the game space forms a predetermined placement pattern (hereinafter called "specific pattern") when the placement of the puzzle block has been determined, the game processing section 110 erases the puzzle blocks forming the specific pattern.

The game processing section 110 includes a puzzle block generation section 111 which generates the puzzle block, a puzzle block control section 112 which controls the movement of the puzzle block, a pattern determination section 113 which determines whether or not the specific pattern has been formed, an erasing target block setting section 114 which sets an erasing target puzzle block (hereinafter called "erasing target block") when the specific pattern has been formed, and an erasing processing section 115 which determines whether or not predetermined conditions have been satisfied (chain determination process described later) when the specific pattern has been formed and erases the erasing target blocks when the predetermined conditions have not been satisfied. Note that the game processing section 110 may have a configuration in which some of these sections are omitted.

The puzzle block generation section 111 sequentially generates various puzzle blocks in the game space at a predetermined timing according to the progress of the game. In more detail, the puzzle block generation section 111 sequentially generates the connected object group (puzzle block) formed by connecting a plurality of objects (hereinafter called "partial blocks") at the top of the display area.

For example, when the game space is a two-dimensional space, the puzzle block generation section 111 according to this embodiment generates various puzzle blocks including three partial blocks. In more detail, the puzzle block generation section 111 generates a puzzle block in which the partial blocks are linearly connected (hereinafter called "linear puzzle block"), a puzzle block in which the partial blocks are connected in the shape of the letter "L" (hereinafter called "L-shaped puzzle block"), and a puzzle block in which two partial blocks are linearly connected and the remaining partial block is connected to the vertex of one of the linearly connected partial blocks (hereinafter called "special puzzle block").

In particular, the puzzle block generation section 111 according to this embodiment separately generates a special puzzle block in which the linearly connected partial blocks and the remaining partial block share only the left vertex in the display area and a special puzzle block in which the linearly connected partial blocks and the remaining partial block share only the right vertex in the display area.

Note that the puzzle block according to this embodiment is not limited to the puzzle blocks having the above-mentioned shapes. When the game space is a three-dimensional space, the special puzzle block is formed by linearly connecting two partial blocks and connecting the remaining partial block to one side of one of the linearly connected partial blocks. Specifically, when the partial block is square, the puzzle block generation section generates special puzzle blocks including linearly connected partial blocks and a partial block connected to one side of one of the linearly connected square partial blocks as different puzzle blocks.

When the player plays a match game against another player such as a virtual player processed based on a program (hereinafter simply called "virtual player"), the puzzle block generation section 111 generates a puzzle block which cannot be operated by the player (hereinafter called "disturbance block") based on the game progress conditions of another player and the like.

In more detail, the puzzle block generation section 111 according to this embodiment generates and stacks a predetermined number of disturbance blocks at the bottom of the display area (game space) (e.g. the bottom of the game space or the top of the puzzle block which has been stacked) based on a predetermined game event such as an event which occurs when another player has erased the puzzle blocks according to conditions for generating the game event (hereinafter called "generation conditions").

In this embodiment, the disturbance block is controlled based on properties differing from those of the puzzle block (e.g. the disturbance block can be used for the chain determination process described later, but cannot be used for determination of the specific pattern).

When the puzzle block generation section 111 has generated the puzzle block, the puzzle block control section 112 causes the puzzle block to fall downward in the display area (game space).

The puzzle block control section 112 controls the movement and the rotation of the falling puzzle block in the display area based on the operation input of the player until the placement of the puzzle block is determined.

In particular, the puzzle block control section 112 according to this embodiment controls the sideways movement of the puzzle block in the display area, a change in falling speed, and the rotation of the puzzle block around the axis perpendicular to the display area (when the game space is a two-dimensional space) according to the operation of the lever, the direction indication key, or the button of the operation section 160.

In this embodiment, the placement of the puzzle block is not determined when the puzzle block has reached the bottom of the display area or the puzzle block which has been stacked, and the sideways movement and rotation operation of the puzzle block in the display area can be performed within a predetermined period of time (e.g. one second) after the puzzle block has reached the bottom of the display area or the puzzle block which has been stacked.

The pattern determination section 113 determines whether or not the object group positioned in the display area (game space) has formed a specific pattern such as a shape in which the partial blocks are arranged in three columns and three rows (hereinafter called "3×3 shape") each time the puzzle block reaches the bottom of the display area or the puzzle block which has been stacked and the placement of the puzzle block is determined.

The erasing target block setting section 114 sets the objects (partial blocks) forming the specific pattern to be the erasing target blocks.

When the erasing processing section 115 has determined that a chain has been formed in the chain determination process described later, the erasing target block setting section 114 sets the partial blocks forming the specific pattern during the chain determination process to be the erasing target blocks in addition to the erasing target blocks set before the chain determination process.

The erasing processing section 115 performs the chain determination process described later to determine whether or not the predetermined conditions have been satisfied by the puzzle block generated after the specific pattern has been formed. When a chain has been formed in the chain determination process, the erasing processing section 115 sets predetermined partial blocks to be the erasing target blocks while maintaining the erasing target blocks. When a chain has not been formed in the chain determination process, the erasing processing section 115 performs an erasing process of erasing the erasing target blocks from the game space.

When the erasing processing section 115 erases the erasing target blocks, the erasing processing section 115 erases the adjacent partial blocks or cancels the connection of the adjacent partial blocks.

In more detail, the erasing processing section 115 erases the partial blocks stacked under the erasing target blocks in the display area (game space) together with the erasing target blocks. The erasing processing section 115 cancels the connection relationship of the partial blocks of the puzzle block stacked on the erasing target blocks (including the puzzle block partially stacked on the erasing target blocks) in the display area (game space). In this case, the puzzle block control section causes the disconnected partial blocks to fall onto the bottom of the display area or the partial block which is not set to be the erasing target block while maintaining the horizontal position of the partial block in the display area after the erasing target blocks have disappeared.

The input information identification section 120 identifies input information input by the player using the operation section 160, a touch panel display, or the sound input device 162.

The image generation section 130 performs a drawing process based on the results of various processes (game calculation processes) performed by the processing section 100, generates an image, and outputs the image to the display section 190. In this case, the image generated by the image generation section 130 may be a two-dimensional image or a three-dimensional image. When generating a three-dimensional image, the image generation section 130 performs a geometric process such as coordinate transformation (world coordinate transformation or camera coordinate transformation), clipping, or perspective transformation, and creates drawing data (e.g. primitive surface vertex coordinates, texture coordinates, color data, normal vector, and alpha-value) based on the processing results. The image generation section 130 draws an object (one or more primitive surfaces) subjected to perspective transformation (geometric process) in a drawing buffer (buffer which can store image information in pixel units such as a frame buffer or intermediate buffer; VRAM) based on the drawing data (primitive surface data). An image viewed from a virtual camera (given viewpoint) is thus generated in the object space.

The sound generation section 140 processes sound based on the results of various processes performed by the processing section 100, generates game sound such as background music (BGM), effect sound, or voice, and outputs the game sound to the sound output section 192.

The image generation system according to this embodiment may be configured as a system dedicated to a single-player mode in which only one player can play a game, or a system also provided with a multiplayer mode in which two or more players can play a game.

When two or more players play a game, game images and game sound provided to the players may be generated using one terminal, or may be generated by a distributed process using two or more terminals (game devices or portable telephones) connected through a network (transmission line or communication line), for example.

The outward appearance configuration of the image generation system (game system) according to this embodiment is described below with reference to FIG. 2. FIG. 2 is an example of an outward appearance view of the image generation system according to this embodiment.

A portable game system 10 includes a first display 12, a second display 22, an operation section such as an arrow key 14 for the player to perform operation input for moving the puzzle block and the like, operation buttons 16 for the player to perform operation input for rotating the puzzle block and the like, a start button 18, and a select button 20, and a sound input device 40 (microphone) which allows the player to input sound (voice). For example, the second display (including a liquid crystal display and a touch panel for detecting contact therewith) 22 may be configured as a touch panel display to allow input using a touch pen 30. Various images (game image and display object) are displayed on the touch panel display 22.

A touch operation (touch input) for the touch panel display 22 may be performed using an input device such as the touch pen 30, or a finger.

The player may play a game by using an operation input using the operation section or an input using the touch panel. The player may use both the operation section and the touch panel.

The first image and the second image may be displayed on one display. In this case, the portable game system 10 may include only one display.

The player may perform the game operation by inputting voice to the sound input device 40. The portable game system 10 may also include a communication device for communicating with another portable game system.

Although FIG. 2 illustrates an example of applying this embodiment to a portable game device, this embodiment may also be applied to an arcade game device (device which allows the player to play a game upon payment of a charge (fee)), a consumer game device other than a portable game device, and the like.

2. Method According to this Embodiment

2.1 Outline of Game Calculation Process

The game calculation process of the image generation system according to this embodiment is described below.

The image generation system according to this embodiment stacks the puzzle block at the bottom of the display area or over the puzzle block which has been stacked while controlling the movement (e.g. sideways movement or rotation) of the puzzle block in the display area based on the operation input of the player, as described above. The image generation system erases the partial block group forming the predetermined pattern each time the puzzle block is stacked when the partial block group including the partial blocks of the puzzle block which has been stacked forms the predetermined pattern, and proceeds with the game until the puzzle block reaches the top of the display area (position at which the puzzle block is generated).

In particular, the image generation system according to this embodiment sets the partial blocks forming the specific pattern to be the erasing target blocks (hereinafter called "specific pattern determination process") each time the placement of the puzzle block in the display area is determined when the partial block group including the partial blocks of the positioned puzzle block and other puzzle blocks forms the specific pattern.

The image generation system determines whether or not the predetermined conditions have been satisfied after the erasing target blocks have been set. The image generation system increases the number of erasing target blocks each time the predetermined conditions are satisfied (continuously increases the number of erasing target blocks as long as the predetermined conditions are satisfied), and repeatedly determines whether or not the predetermined conditions have been satisfied (hereinafter called "chain determination process") until the predetermined conditions are not satisfied.

The image generation system performs the erasing process of erasing the erasing target blocks from the game space together with the partial blocks stacked under the erasing target blocks in the display area when the predetermined conditions have not been satisfied, regardless of whether the predetermined condition determinations have been made twice or ten and several times.

On the other hand, when the player has erased a number of partial blocks at one time, the image generation system according to this embodiment allows the player to advantageously play the game such as providing high points or bonus points or performing a process for satisfying game clear conditions.

Therefore, since the image generation system according to this embodiment increases the number of erasing target blocks when the specific pattern is continuously formed each time the puzzle block is positioned without erasing the erasing target blocks each time the puzzle block is positioned, and erases the erasing target objects when the predetermined conditions have not been satisfied, the player's interest can be improved by adding an amusing element to the object erasing process.

2.2 Specific Pattern Determination Process

Figure 3A:
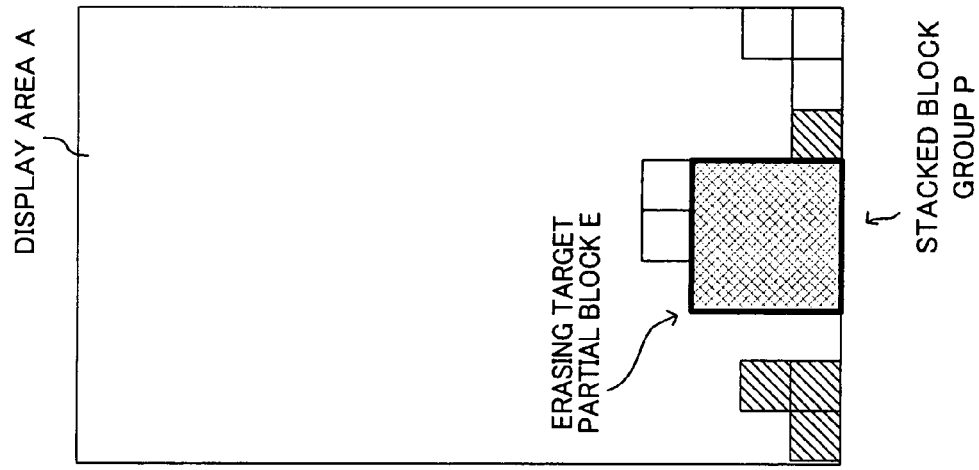
FIGS. 3A to 3C are views illustrative of a specific pattern determination process of an image generation system according to one embodiment of the invention.
Figure 3B:
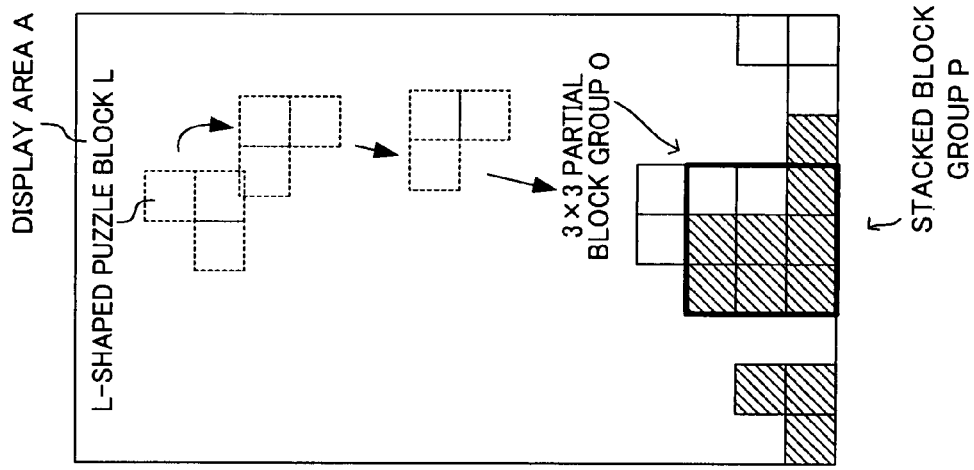
Figure 3C:
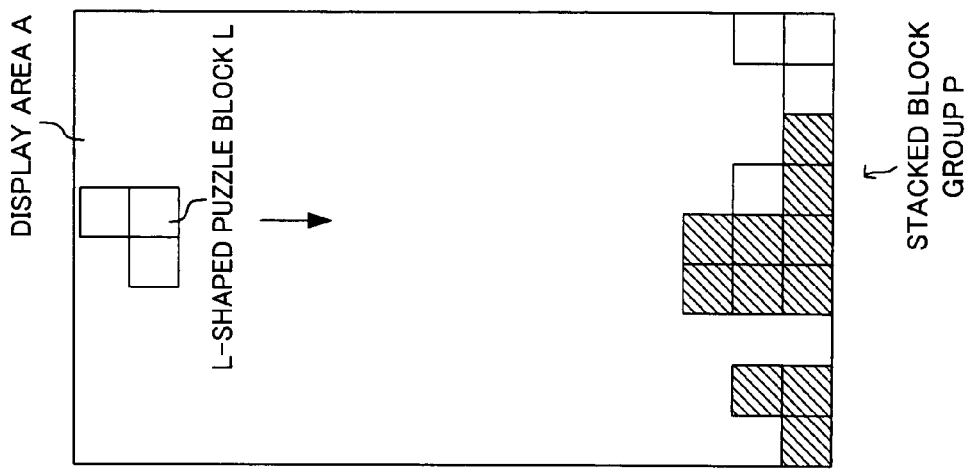

The specific pattern determination process of the image generation system according to this embodiment is described below with reference to FIGS. 3A to 3C. FIGS. 3A to 3C are views illustrative of the specific pattern determination process of the image generation system according to this embodiment.

As shown in FIGS. 3A to 3C, the image generation system according to this embodiment performs the specific pattern determination process of setting a partial block group to be the erasing target blocks when a partial block group arranged in three rows and three columns (i.e. partial block group having 3×3 shape) has been formed by the partial blocks (objects) in the display area (game space).

For example, when a partial block group (hereinafter called "stacked block group") P including less than 3×3 partial blocks is stacked at the bottom of a display area A, as shown in FIG. 3A, when the player has performed an operation input so that an L-shaped puzzle block L generated at the top of the display area fills up the stacked block group P to form a 3×3 puzzle block group, the image generation system according to this embodiment determines that the partial block group forms the specific pattern when the placement of the L-shaped puzzle block L has been determined.

Specifically, when a partial block group O having a 3×3 shape (hereinafter called "3×3 partial block group") has been formed by the partial blocks included in the stacked block group P and the L-shaped puzzle block L when the placement of the L-shaped puzzle block L has been determined, the image generation system according to this embodiment determines that the partial block group forms the specific pattern.

As shown in FIG. 3C, the image generation system sets the partial blocks forming the 3×3 partial block group O which forms the specific pattern to be erasing target blocks (group) E.

2.3 Chain Determination Process

Figure 4C:
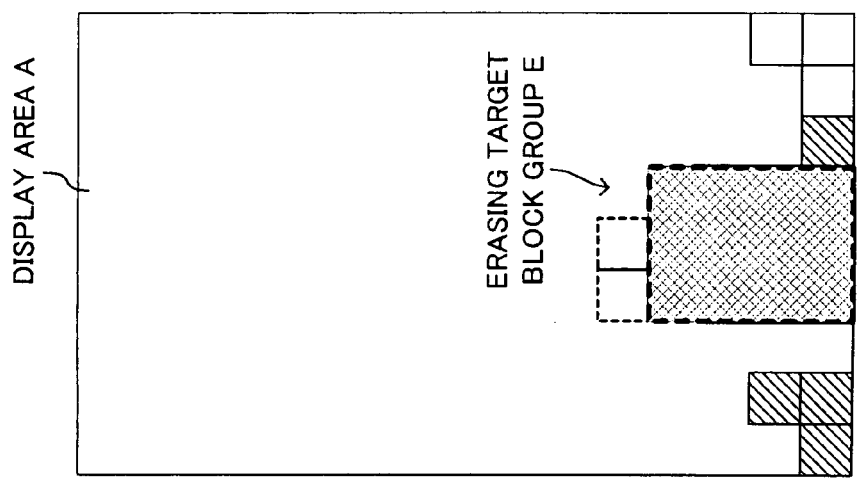
FIGS. 4A to 4C are views illustrative of a next-block chain determination process of an image generation system according to one embodiment of the invention.
Figure 4B:
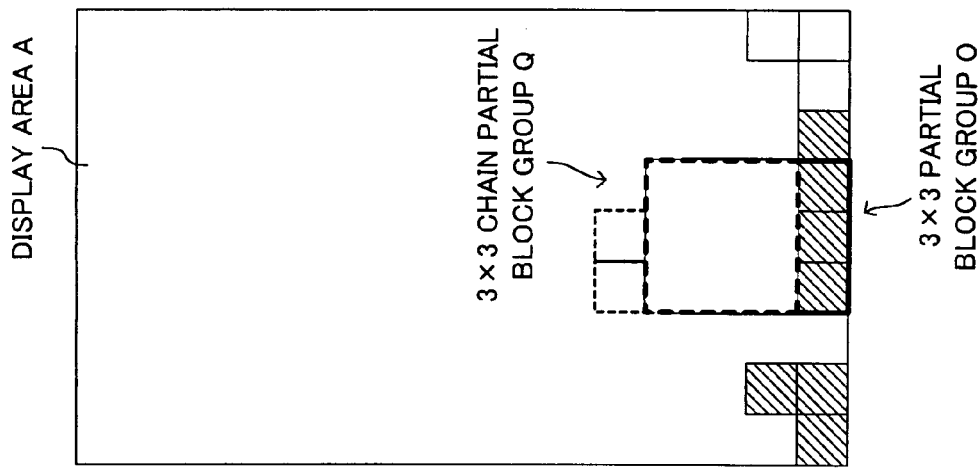
Figure 4A:
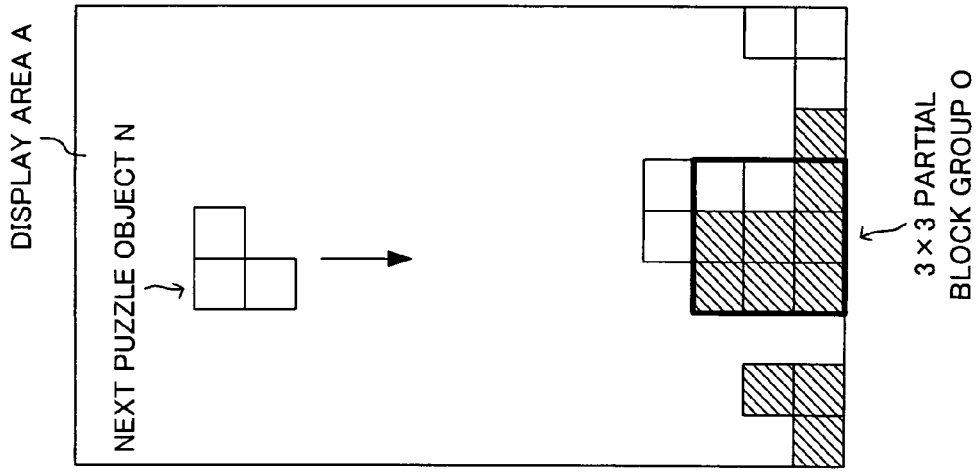
Figure 5A:
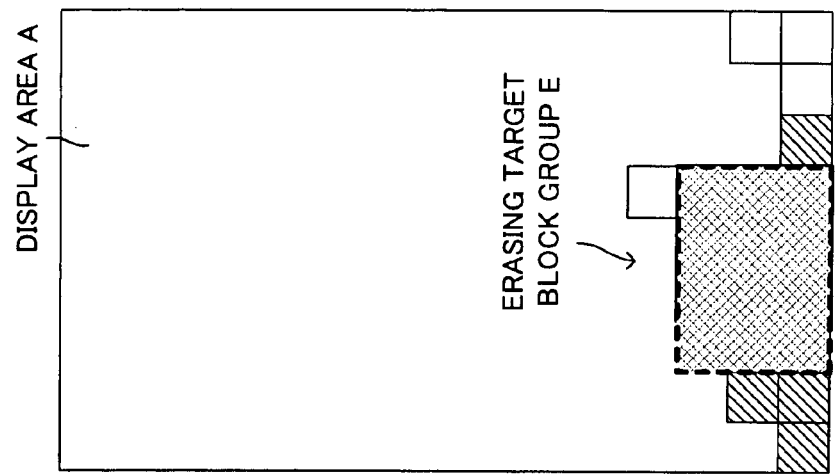
FIGS. 5A to 5C are views illustrative of a time-limit chain determination process of an image generation system according to one embodiment of the invention.
Figure 5B:
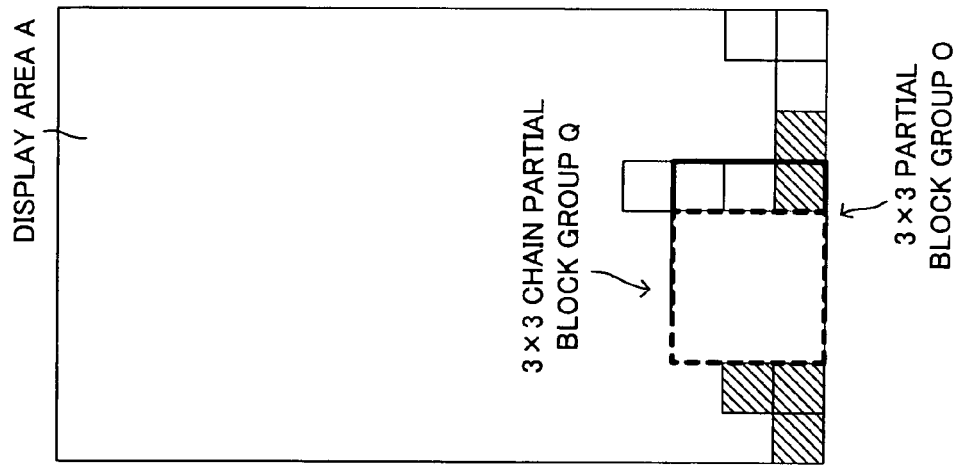
Figure 5C:
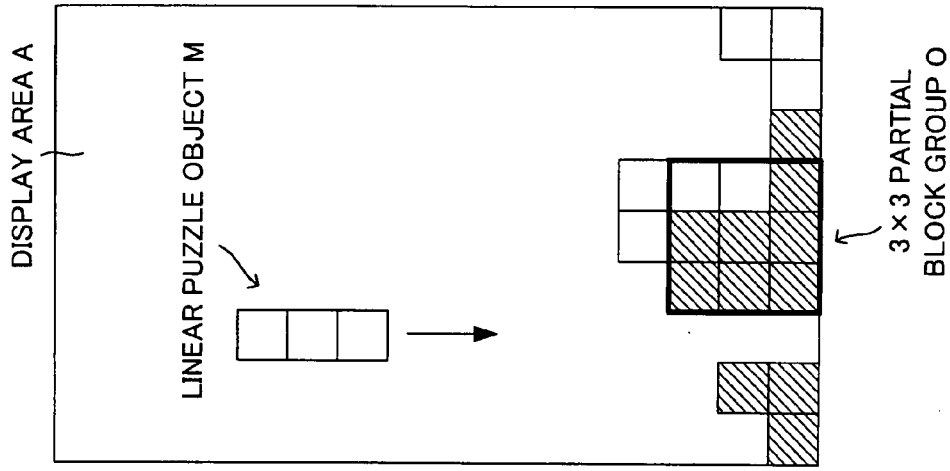
Figure 6B:
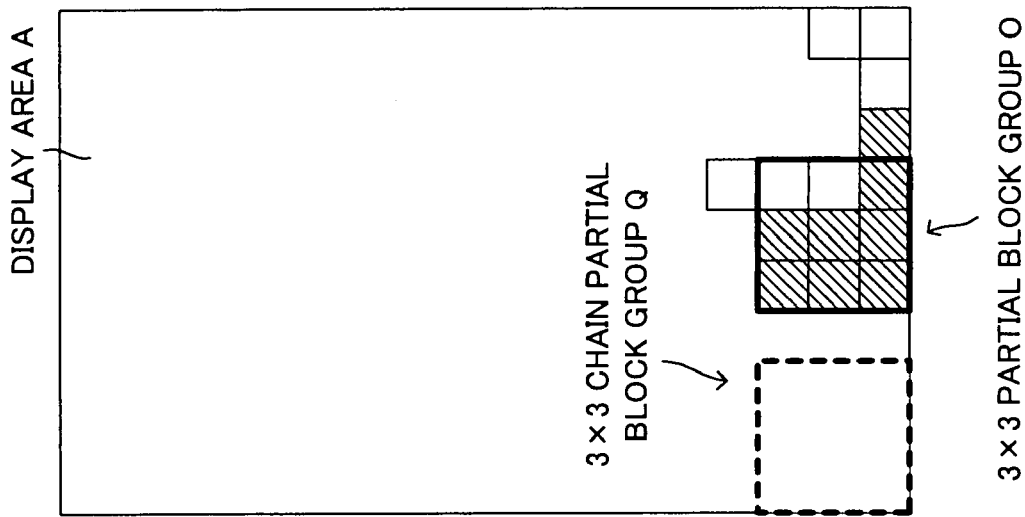
FIGS. 6A and 6B are views illustrative of another example of a chain determination process of an image generation system according to one embodiment of the invention.
Figure 6A:
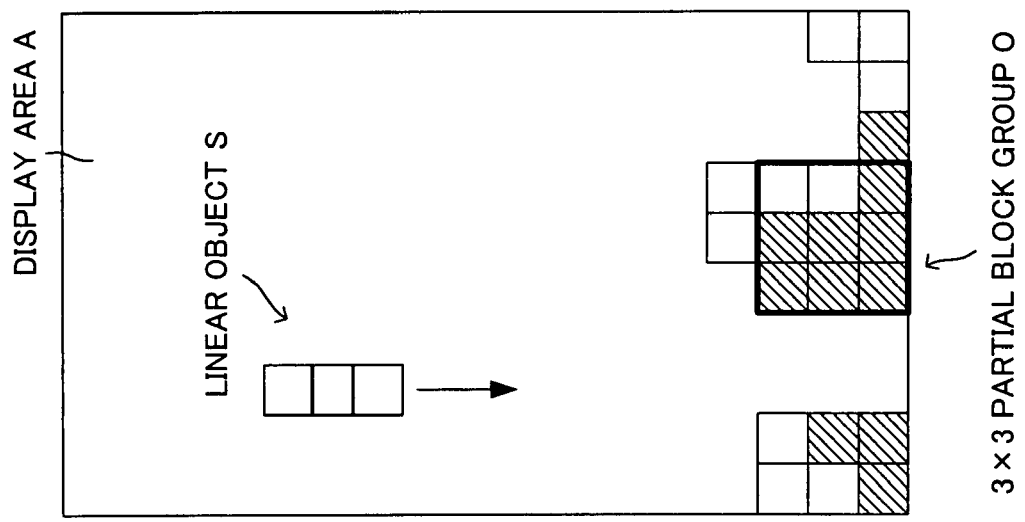
Figure 7C:
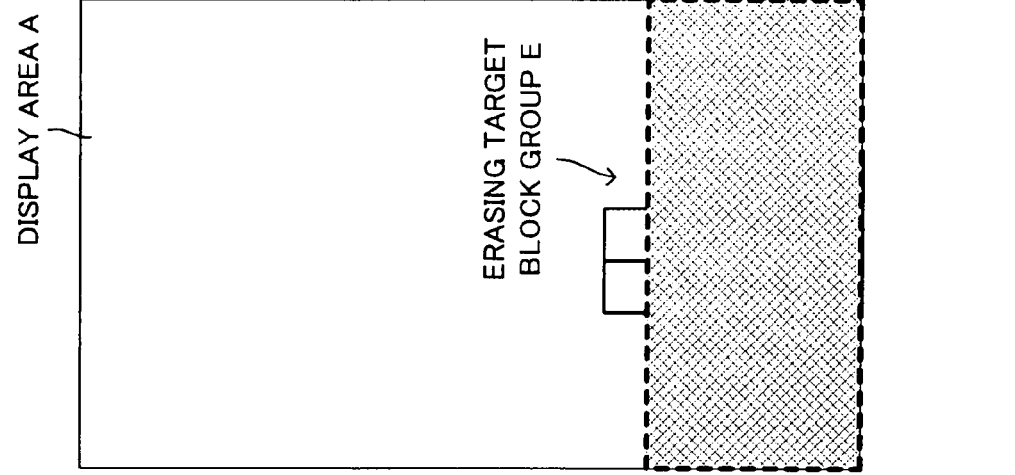
FIGS. 7A to 7C are views illustrative of a chain redetermination process of an image generation system according to one embodiment of the invention.
Figure 7B:
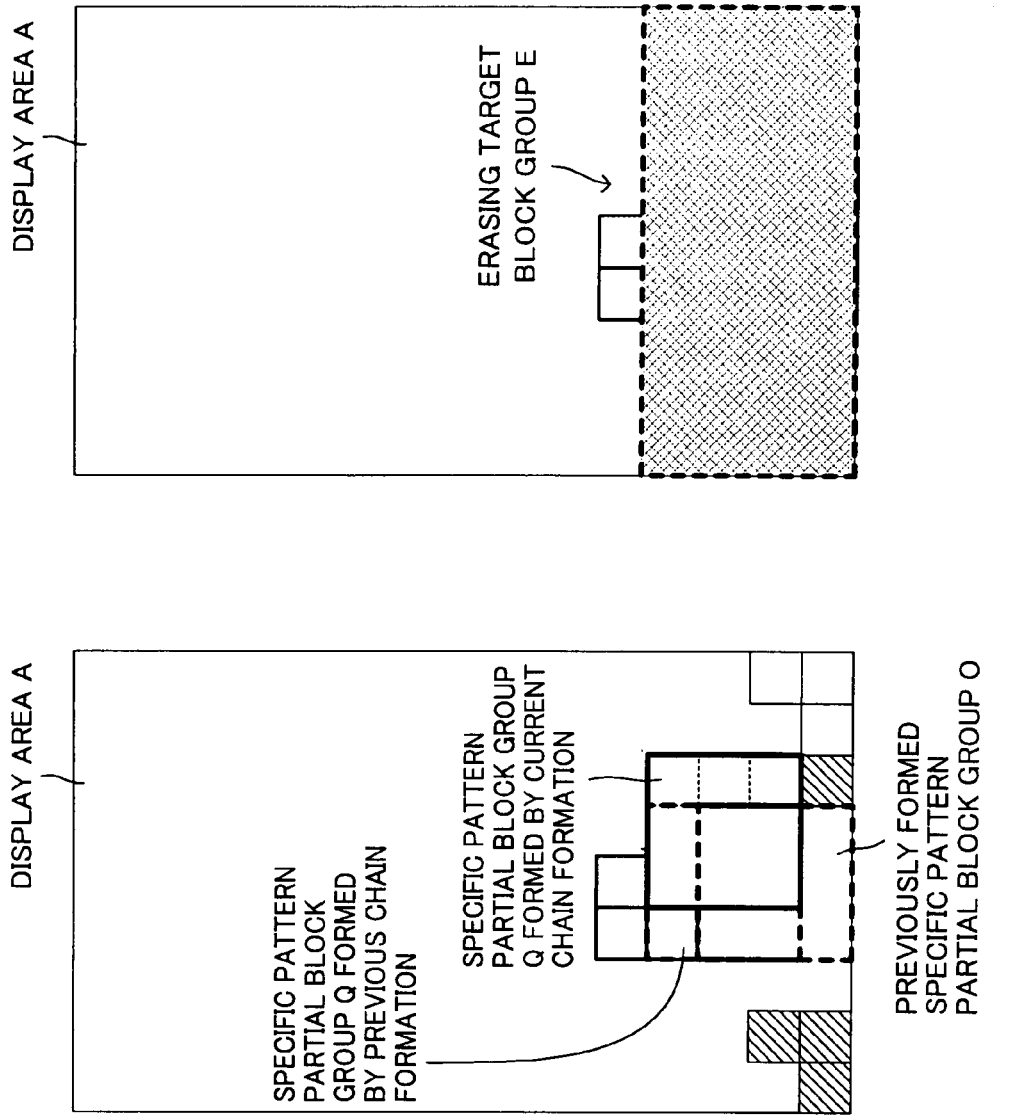
Figure 7A:
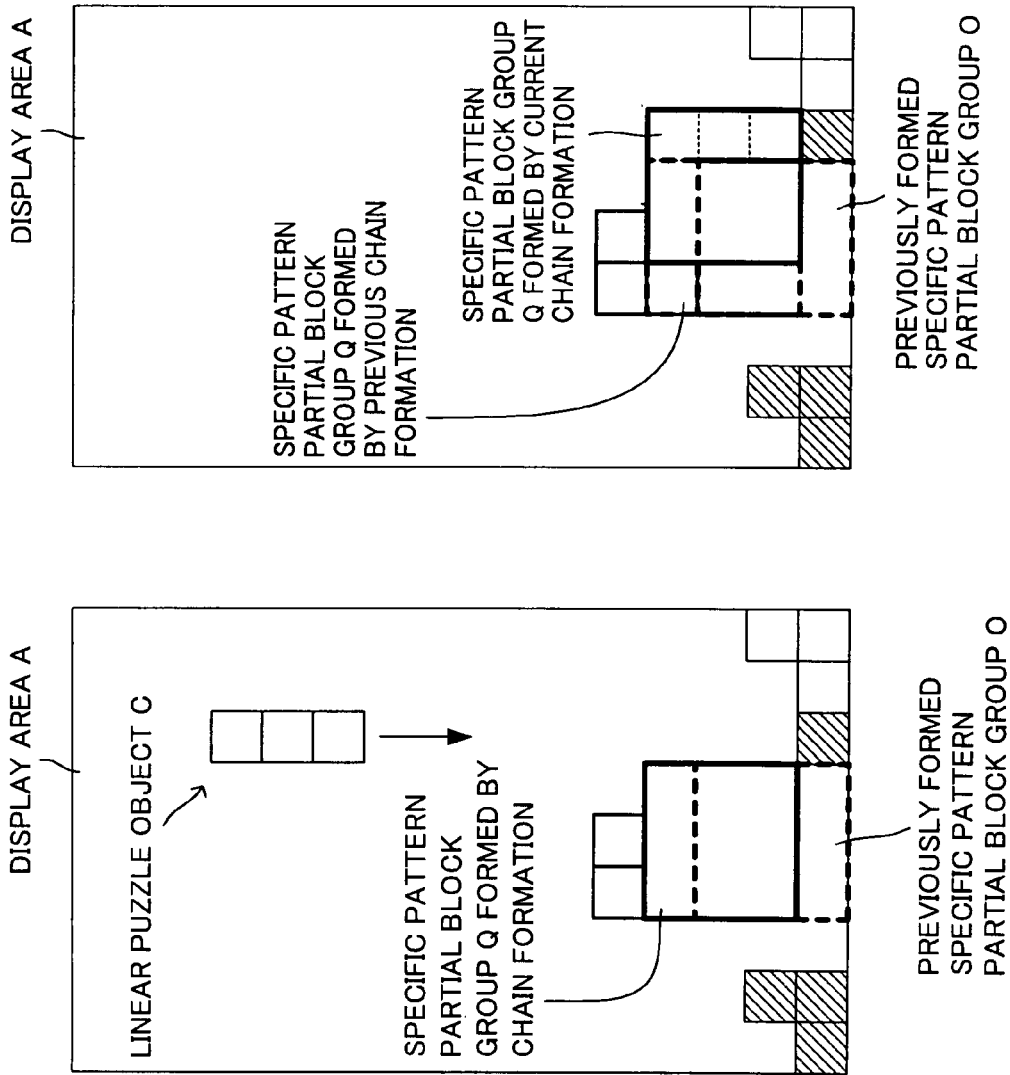

The chain determination process of the image generation system according to this embodiment is described below with reference to FIGS. 4A to 7C. FIGS. 4A to 4C are views illustrative of a next-block chain determination process of the image generation system according to this embodiment, and FIGS. 5A to 5C are views illustrative of a time-limit chain determination process of the image generation system according to this embodiment. FIGS. 6A and 6B are views illustrative of another example of the chain determination process of the image generation system according to this embodiment, and FIGS. 7A to 7C are views illustrative of a chain redetermination process of the image generation system according to this embodiment.

After the specific pattern determination process, the image generation system according to this embodiment performs the chain determination process of determining whether or not the specific pattern has been formed based on the partial blocks included in the puzzle block (hereinafter called "next puzzle block") which has been generated after the puzzle block including the partial blocks used for the specific pattern determination process (hereinafter called "preceding puzzle block") (hereinafter called "next-block chain determination process"), or determining whether or not a partial block group forming the specific pattern has been formed within a predetermined period of time (hereinafter called "time limit") after the erasing target blocks have been set in the specific pattern determination process (hereinafter called "time-limit chain determination process").

In the next-block chain determination process, as shown in FIG. 4A, when the next puzzle block (L-shaped puzzle block) N generated after the specific pattern determination process has been positioned at a predetermined position in the display area based on the input operation of the player and the placement has been determined, the image generation system according to this embodiment determines whether or not a 3×3 partial block group differing from the specific pattern formed by the preceding puzzle block (partial object group O (hereinafter called "preceding specific pattern")) has been formed using the next puzzle block, for example.

When a 3×3 partial block group (hereinafter called "3×3 chain partial block") Q has been formed by the next puzzle block (i.e. when the specific pattern has been formed by the partial block group including the partial block included in the next puzzle block N (hereinafter called "next specific pattern")), as shown in FIG. 4B, the image generation system sets the partial blocks included in the erasing target blocks (group) O forming the preceding specific pattern and the 3×3 chain partial block group Q forming the next specific pattern to be the erasing target blocks (see erasing target block group E), as shown in FIG. 4C.

In the time-limit chain determination process, the image generation system according to this embodiment starts measuring the period of time until the time limit expires when the erasing target blocks have been set in the specific pattern determination process, and determines whether or not the 3×3 partial block group Q differing from the preceding specific pattern (partial block group O) has been formed by the partial blocks of a puzzle block (e.g. linear puzzle block) M generated within the time limit, as shown in FIG. 5A.

When a 3×3 shape has been formed by the partial blocks of the puzzle blocks (i.e. when the specific pattern has been formed by the partial blocks of the puzzle blocks), as shown in FIG. 5B, the image generation system sets the partial blocks forming the preceding specific pattern O and the specific pattern Q to be the erasing target blocks (group) E, as shown in FIG. 5C.

In this embodiment, the 3×3 preceding specific pattern used for the chain determination process may be determined in each chain determination process using the 3×3 puzzle block group which has been partially used in the preceding specific pattern process, as described above, or a 3×3 partial block group may be formed independently of the puzzle block group used for the preceding specific pattern, as shown in FIGS. 6A and 6B.

In the image generation system according to this embodiment, when the specific pattern has been formed within the time limit in the time-limit chain determination process, the puzzle block forming the specific pattern may not be the puzzle block generated immediately after the puzzle block used for the specific pattern determination process. Note that the puzzle block forming the specific pattern may be limited to the puzzle block generated immediately after the puzzle block used for the specific pattern determination process in the same manner as in the next-block chain determination process.

When the predetermined conditions have been satisfied in the chain determination process (i.e. when the image generation system has determined that the specific pattern has been formed), the image generation system according to this embodiment performs a similar chain determination process (hereinafter called "chain redetermination process"). The image generation system continuously and repeatedly performs the chain redetermination process until the predetermined conditions are not satisfied in the chain determination process (i.e. until the specific pattern is not formed).

When a chain has been formed in the chain redetermination process, the image generation system sets the partial blocks of the 3×3 partial block group formed when the chain is formed in the current chain determination process to be the erasing target objects in addition to the erasing target objects set during the specific pattern determination process or the preceding chain redetermination process to increase the number of erasing target blocks.

In the next-chain determination process, when the 3×3 partial block group O exists in the next-block chain determination process and the placement of the puzzle block (linear puzzle block) C generated after the next puzzle block has been determined, as shown in FIG. 7A, the image generation system according to this embodiment determines whether or not the 3×3 partial block group has been formed by the partial blocks of the linear puzzle block C and the stacked block group which has been stacked in a region differing from the preceding specific pattern and the next specific pattern. In this case, the image generation system positions a different puzzle block in the 3×3 partial block group and performs the chain redetermination process, as shown in FIG. 7B.

When the image generation system according to this embodiment has determined that the 3×3 shape has been formed by the partial blocks in the time-limit chain determination process, the image generation system determines whether or not the 3×3 shape differing from the preceding specific pattern and the next specific pattern has been formed by the partial blocks by positioning the puzzle block within the time limit in the same manner as in the next-block chain determination process. When the 3×3 shape has been formed by the partial blocks, the image generation system further performs the chain redetermination process in the same manner as in the next-block chain determination process.

When the 3×3 partial block group or the 3×3 chain partial block has been continuously formed several times in the chain determination process, the erasing target objects (group) E are set, as shown in FIG. 7C.

When performing the chain redetermination process in the time-limit chain determination process according to this embodiment, the time limit may be reduced in comparison with the time limit used for the preceding chain determination process or the preceding chain redetermination process. In this embodiment, a predetermined period of time reduced from the time limit may be changed based on the generation count of the specific pattern formed by the puzzle blocks and having a predetermined shape, the continuous generation count (chain count) of the specific pattern, the number of erasing target blocks which have been set in the previous chain determination process or chain redetermination process, the game process status or the degree of difficulty of the game set by the player, and the period of time elapsed after starting the game.

2.4 Erasing Process

Figure 8C:
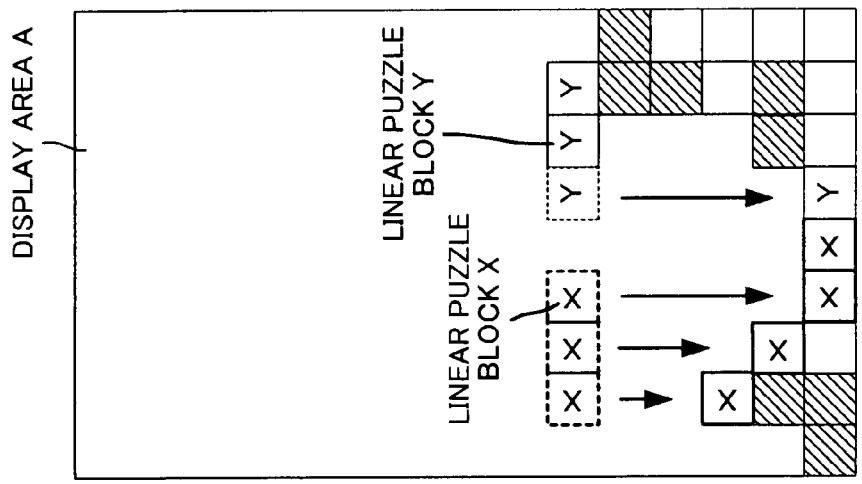
FIGS. 8A to 8C are views illustrative of an erasing process of an image generation system according to one embodiment of the invention.
Figure 8B:
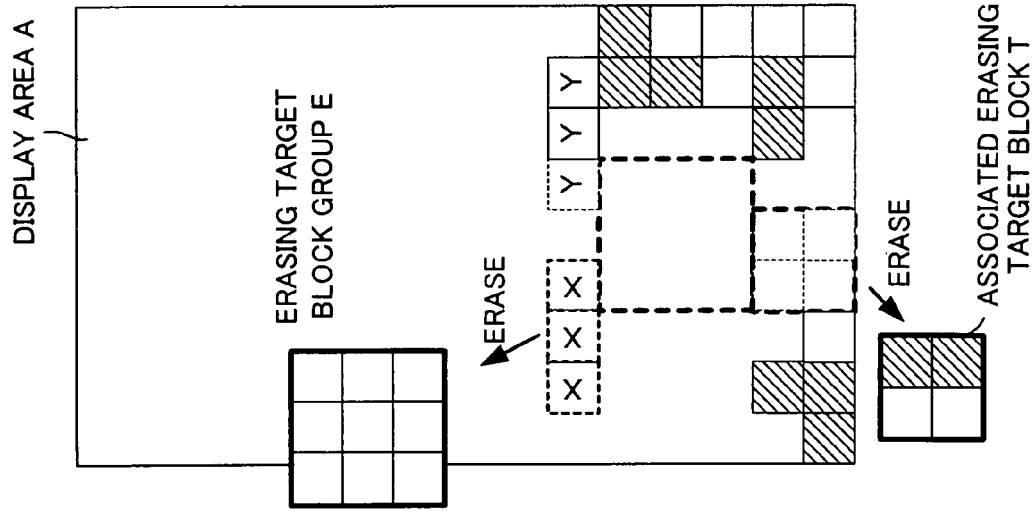
Figure 8A:
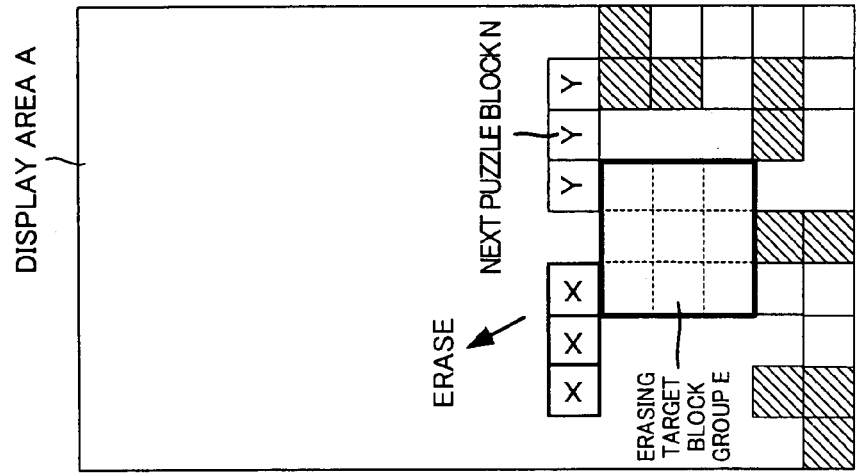

The erasing process of the image generation system according to this embodiment is described below with reference to FIGS. 8A to 8C. FIGS. 8A to 8C are views illustrative of the erasing process of the image generation system according to this embodiment.

The image generation system according to this embodiment erases the erasing target blocks set in the specific pattern determination process and the chain determination process when the predetermined conditions have not been satisfied in the chain determination process.

For example, when the next puzzle block N has been positioned and the placement has been determined, as shown in FIG. 8A, the image generation system according to this embodiment erases the erasing target blocks (group) E which have been set, since a 3×3 partial block group is not formed in the next-block chain determination process.

In the time-limit chain determination process, the image generation system according to this embodiment performs the erasing process based on the erasing target blocks (group) E when a 3×3 partial block group has not been formed within the time limit.

On the other hand, when the image generation system according to this embodiment erases the erasing target blocks, the image generation system erases the partial blocks positioned under the erasing target blocks in the display area (hereinafter called "associated erasing target blocks") together with the erasing target blocks.

For example, when the erasing target objects (group) E are erased as shown in FIG. 8A, the image generation system according to this embodiment erases the partial block stacked under the erasing target object in the same column as the erasing target object in the display area together with the erasing target object as the associated erasing target blocks, as shown in FIG. 8B.

When the partial block of the puzzle block is not positioned in the same column as the erasing target object in the display area, the image generation system according to this embodiment erases only the partial block positioned in the same column as the erasing target object as the associated erasing target block.

The image generation system according to this embodiment cancels the connection relationship of the puzzle block positioned over the erasing target blocks in the display area (hereinafter called "connection cancellation block") or cancels the connection relationship of the partial blocks positioned over the erasing target blocks (hereinafter called "connection cancellation partial blocks") and the remaining partial blocks when the entire puzzle block is not positioned over the erasing target blocks, and positions the partial blocks at the bottom of the display area after the erasing target blocks and the associated erasing target blocks have disappeared.

For example, when the erasing target blocks have disappeared, as shown in FIG. 8C, the image generation system according to this embodiment cancels the connection relationship of the connection cancellation block (linear puzzle block) X positioned over the erasing target blocks and cancels the connection relationship of the connection cancellation partial blocks (partial blocks of linear puzzle block) Y positioned over the erasing target blocks, and positions the disconnected partial blocks.

2.5 Disturbance Block in Match Mode

Figure 9B:
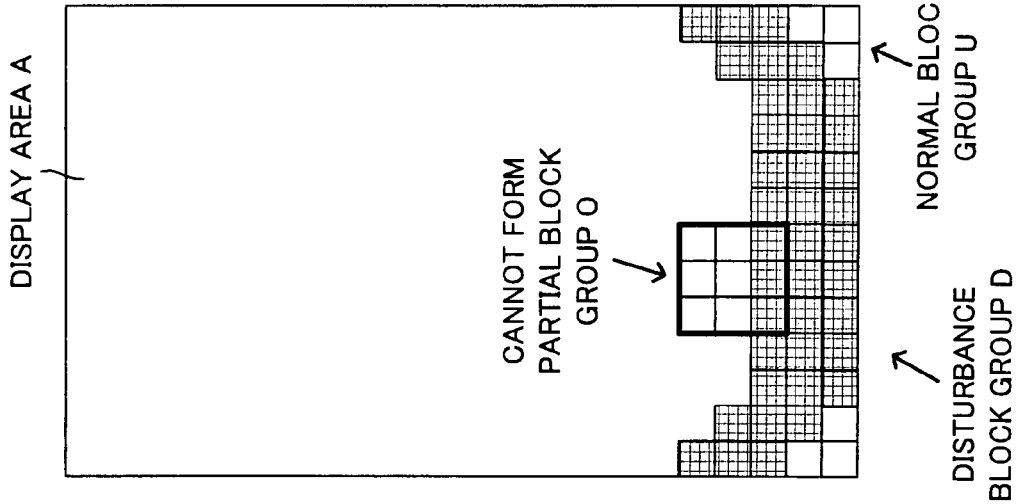
FIGS. 9A and 9B are views illustrative of a disturbance block generation process of an image generation system according to one embodiment of the invention.
Figure 9A:
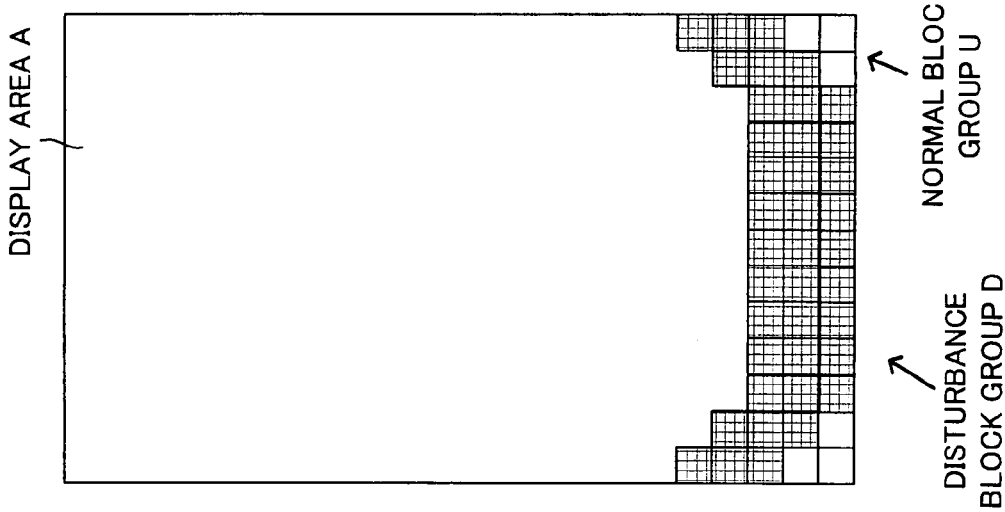

A process of generating the disturbance block (hereinafter called "disturbance block generation process") and a chain determination process using the disturbance block (hereinafter called "disturbance block chain determination process") of the image generation system according to this embodiment are described below with reference to FIGS. 9A to 11B. FIGS. 9A and 9B are views illustrative of the disturbance block generation process of the image generation system according to this embodiment, and FIGS. 10A to 10C and FIGS. 10A and 11B are views illustrative of the disturbance block chain determination process of the image generation system according to this embodiment.

When the player plays a match against another player, the image generation system according to this embodiment performs the disturbance block generation process based on a game event which occurs when another player or the like erases the puzzle block during the match, and performs the chain determination process involving the disturbance block as the disturbance block chain determination process when the disturbance block is generated in the display area in addition to the above-described specific pattern determination process, chain determination process, and erasing process.

Disturbance Block Generation Process

When another player has erased the erasing target objects, the image generation system according to this embodiment generates a puzzle block which cannot be operated by the player as the disturbance block at the bottom of the display area or over the puzzle block which has been stacked at the bottom of the display area based on the number of blocks of the erasing target object.

Specifically, when the player plays a match against another player, the image generation system according to this embodiment generates the disturbance block in another player's display area based on erasure of the puzzle blocks instead of merely erasing the puzzle blocks so that the stacked puzzle block immediately reaches the top of the other player's display area (i.e. so that one of the players loses the game earlier than another player).

Therefore, since the image generation system according to this embodiment can incorporate a competitive element relating to the object erasing process when the player plays a match against another player, the image generation system can provide interest at a different level than when a single player plays the game.

For example, when another player has erased the puzzle block from the game space, the image generation system according to this embodiment positions a disturbance block (group) D which cannot be operated by the player at the bottom of the player-side display area A and over the puzzle block which has been stacked, as shown in FIG. 9A.

When the disturbance block is positioned, as shown in FIG. 9B, the image generation system does not determine that the specific pattern has been formed, even if a 3×3 partial block group has been formed by the partial blocks of a normal puzzle block (i.e. puzzle block (hereinafter called "normal block") U generated at the top of the player's display area) and the disturbance block D.

Although the image generation system according to this embodiment generates the disturbance block when the player plays a match against another player, the image generation system may also generate the disturbance block during a single-player mode under predetermined conditions such as when a predetermined period of time has elapsed or a predetermined timing has occurred.

Disturbance Block Chain Determination Process

The image generation system according to this embodiment changes the disturbance block generated as described above into the normal block or the partial block of the normal block under predetermined conditions, and performs the chain determination process involving the disturbance block which has been changed into the normal block.

Therefore, the image generation system according to this embodiment can maintain the player's interest during the progress of the game by facilitating the puzzle solution method when increasing the number of puzzle blocks instead of merely incorporating the competitive element by increasing the number of disturbance blocks in the game space based on the game progress conditions of another player or the like.

For example, when the specific pattern has been formed by only the normal blocks (group) U, as shown in FIG. 10A, when the disturbance blocks (group) D have been stacked, as shown in FIGS. 9A to 9C, the image generation system according to this embodiment changes the disturbance block D adjacent to the puzzle block or the partial block forming the specific pattern into the normal block U or the partial block of the normal block U, as shown in FIG. 10B.

When the disturbance block D has been changed into the partial blocks Du of the normal block, the image generation system performs the above-described chain determination process of determining whether or not the 3×3 chain partial block group Q is formed by the normal block U or the partial blocks of the normal block U into which the disturbance block D has been changed, as shown in FIG. 10C. In this case, the image generation system performs the chain determination process when the disturbance block D has been changed to the normal block U or performs the chain redetermination process in the time-limit determination process.

When the image generation system has determined that a chain has been formed in the chain redetermination process performed after the chain determination process shown in FIG. 10C, the image generation system changes the disturbance block D adjacent to the disturbance block D which has been changed into the normal block into the normal block U, as shown in FIG. 11A, and further performs the chain redetermination process in the same manner as described above.

The image generation system repeatedly performs the chain redetermination process and sets the erasing target blocks (group) E until a chain is not formed in the chain redetermination process (i.e. until a chain is not formed by the disturbance object changed into the normal object), as shown in FIG. 11B.

When the specific pattern has been formed in the chain redetermination process, the image generation system according to this embodiment increases the number of erasing target objects in the same manner as in the chain determination process.

2.6 Others

A puzzle block rotation control process of the image generation system according to this embodiment is described below with reference to FIGS. 12A and 12B. FIGS. 12A and 12B are views illustrative of the puzzle block rotation control process of the image generation system according to this embodiment.

When the image generation system according to this embodiment controls the rotation of the puzzle block positioned based on the positional relationship with the puzzle block which has been positioned at the bottom of the display area, the image generation system rotatably controls the puzzle block, even if the puzzle block interferes with the puzzle block which has been positioned during rotation, when the puzzle block does not interfere with the puzzle block which has been positioned after rotation.

As shown in FIG. 12A, when a space (hereinafter called "closed space") R is formed which is enclosed by a stacked block group P including the puzzle block which has been positioned or the partial block of the puzzle block, and a special puzzle block G has been positioned adjacent to the stacked block group P forming the space R, the image generation system according to this embodiment rotatably controls the special puzzle block G, as shown in FIG. 12B.

Specifically, even if a partial block G3 of the special puzzle block which is connected to one vertex of partial blocks G1 and G2 interferes with the puzzle block group (partial block H) which has been positioned when rotated clockwise by 90° by the input operation of the player, the image generation system according to this embodiment rotatably controls the special puzzle block if the partial block G3 is positioned in the closed space after rotation and the partial blocks G1 and G2 do not interfere with the puzzle block which has been positioned, as shown in FIG. 12B.

This embodiment illustrates the puzzle block rotation control process using an example in which the special block is positioned adjacent to the puzzle block group having the closed space. Note that the image generation system can also perform the above rotation control process when the closed space is not formed, when the puzzle block is the linear puzzle block or the L-shaped puzzle block, when another puzzle block is adjacently positioned, or when the display area is a three-dimensional space and each puzzle block is three-dimensionally formed (e.g. puzzle block having a portion connected to another partial block through one side).

As described above, since the image generation system according to this embodiment can facilitate the puzzle solution by the above-described rotation control and can provide the player's interest regarding the operation, the image generation system can maintain interest throughout the entire game.

3. Process According to this Embodiment 3.1 Game Calculation Process Using Next-Block Chain Determination Process A detailed processing example of the game calculation process of the image generation system according to this embodiment when performing the next-block chain determination process is described below with reference to FIGS. 13 and 14.

Figure 13:
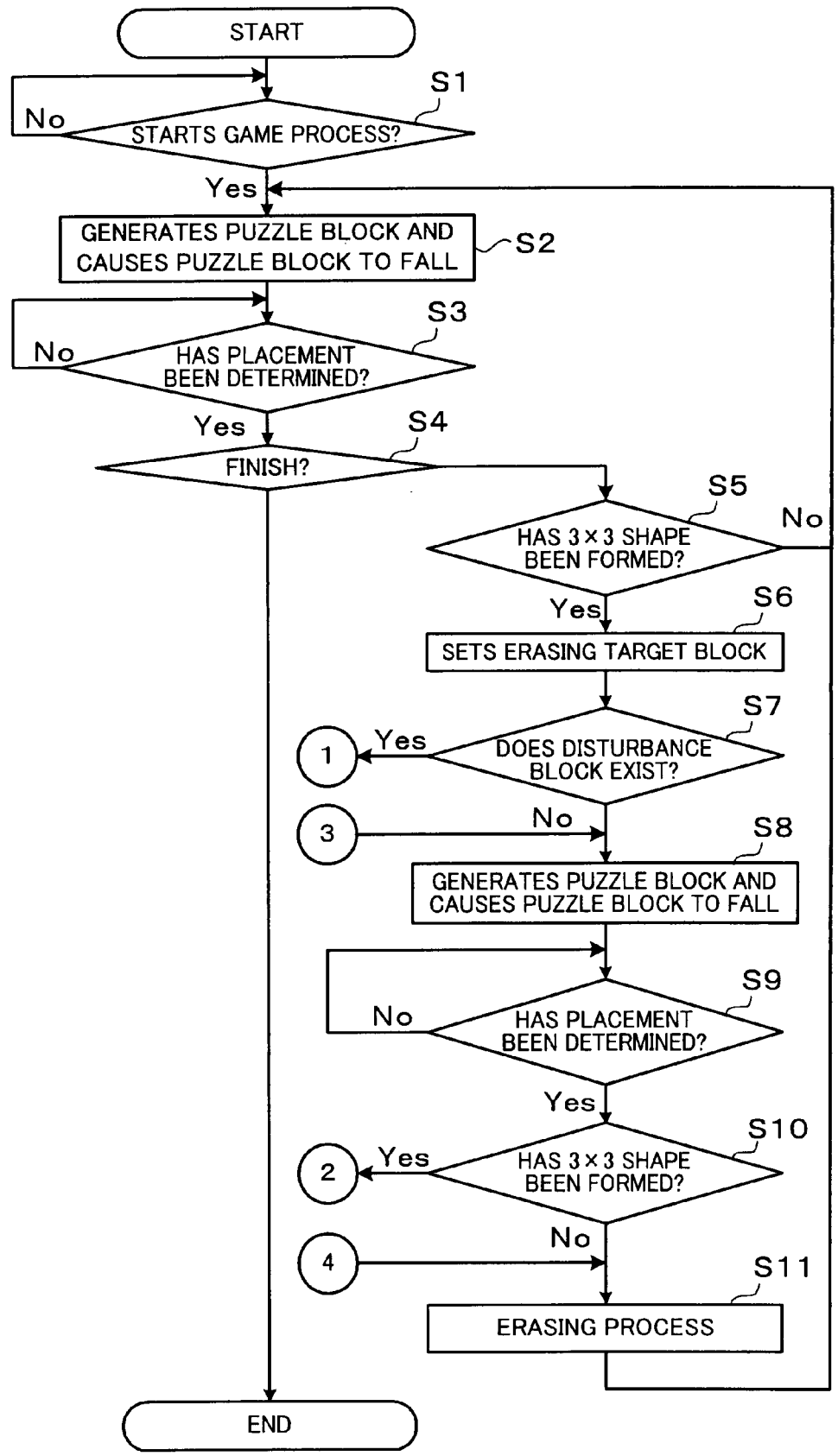
FIG. 13 is a flowchart showing a player-side game calculation process (next-block chain determination process) of an image generation system according to one embodiment of the invention.
Figure 14:
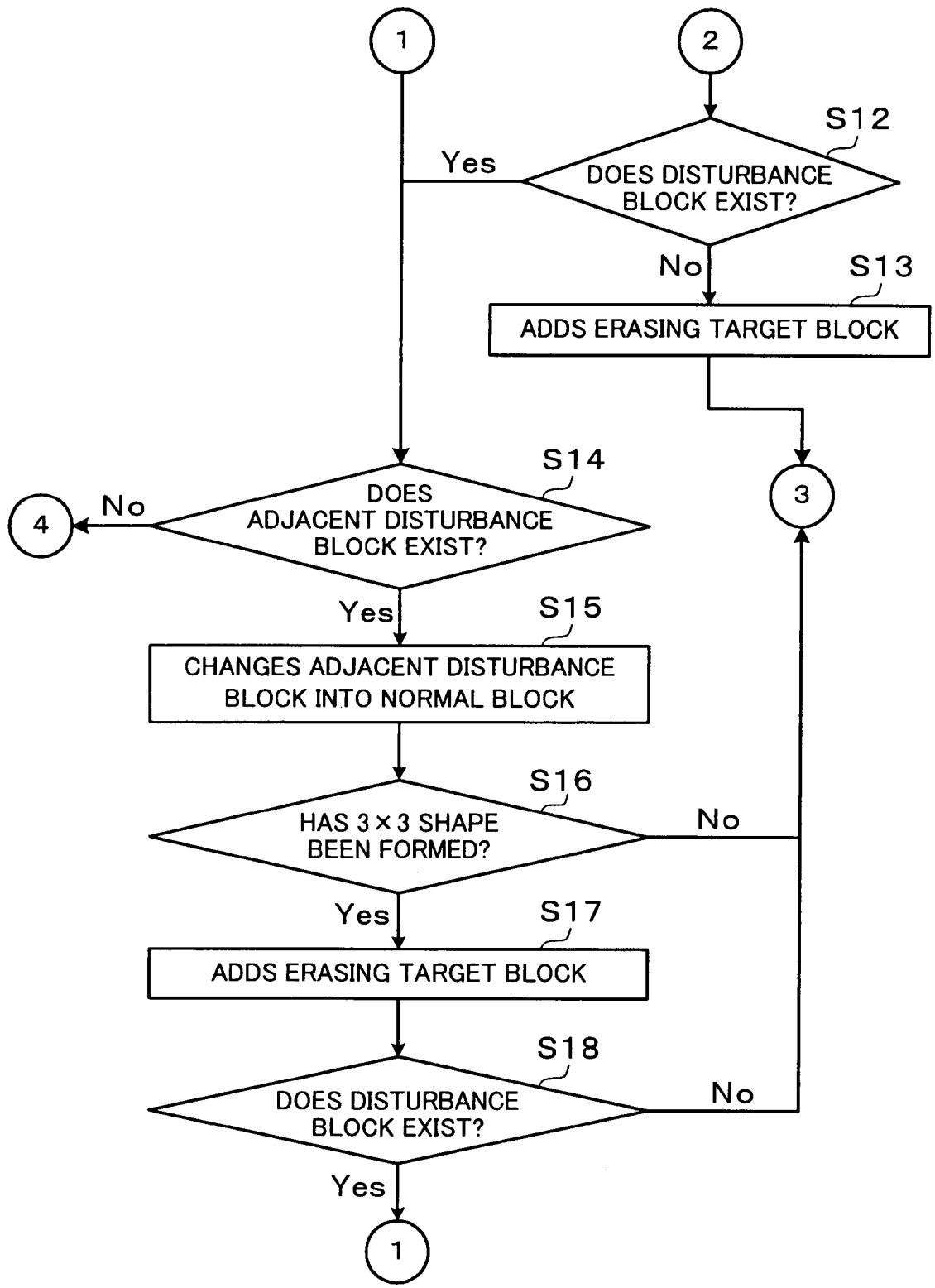
FIG. 14 is another flowchart showing a player-side game calculation process (next-block chain determination process) of an image generation system according to one embodiment of the invention.

The following example illustrates the player-side game calculation process when the player plays a match with another player. FIGS. 13 and 14 are flowcharts showing the player-side game calculation process (next-block chain determination process) of the image generation system according to this embodiment.

When the image generation system has started the game calculation process of a match game with another player (step S1), the image generation system generates a predetermined puzzle block at the top of the display area and causes the generated puzzle block to fall downward (step S2). When the generated puzzle block has started to fall, the image generation system starts to accept the operation input of the player relating to the movement, the rotation, and a change in speed of the puzzle block in the display area.

The image generation system determines whether or not the falling puzzle block has been positioned at the bottom of the display area or over the puzzle block or the partial block remaining in the display area (hereinafter called "remaining block") and a predetermined period of time has elapsed (i.e. the placement of the puzzle block has been determined) (step S3).

The image generation system controls the puzzle block to fall in the display area at a predetermined speed according to the operation of the player until the image generation system determines that the placement of the puzzle block has been determined after the generated puzzle block has started to fall in the display area. The image generation system repeatedly performs the process in the step S3 until the image generation system determines that the placement of the puzzle block has been determined.

When the image generation system has determined that the placement of the falling puzzle block has been determined, the image generation system determines whether or not the puzzle block is positioned in the puzzle block generation region of the display area (step S4).

Specifically, the image generation system determines whether or not to finish the game calculation process. The image generation system finishes the game calculation process when the puzzle block is positioned in the puzzle block generation region of the display area. When the puzzle block is not positioned in the puzzle block generation region, the image generation system transitions to a process in a step S5.

The image generation system performs the specific pattern determination process based on the puzzle block of which the placement has been determined and the remaining blocks (step S5). Specifically, the image generation system determines whether or not a 3×3 partial block group has been formed.

When the image generation system has determined that the specific pattern has not been formed, the image generation system transitions to the process in the step S2. When the image generation system has determined that the specific pattern has been formed, the image generation system transitions to a process in a step S6.

The image generation system sets each partial block forming the specific pattern to be the erasing target block (step S6), and determines whether or not the disturbance block exists in the display area (step S7). When the image generation system has determined that the disturbance block does not exist in the display area in the process in the step S7, the image generation system transitions to a process in a step S8. When the image generation system has determined that the disturbance block exists in the display area, the image generation system transitions to a process in a step S14.

The image generation system generates a predetermined puzzle block at the top of the display area and causes the generated puzzle block to fall downward in the same manner as in the process in the step S2 (step S8). When the generated puzzle block has started to fall downward, the image generation system starts to accept the operation input of the player relating to the movement, the rotation, and a change in speed of the puzzle block in the display area in the same manner as in the process in the step S2.

The image generation system determines whether or not the falling puzzle block has been positioned at the bottom of the display area or over the puzzle block or the partial block (hereinafter called "remaining block") remaining in the display area and a predetermined period of time has elapsed (i.e. the placement of the puzzle block has been determined) in the same manner as in the process in the step S3 (step S9).

The image generation system causes the puzzle block to fall in the display area at a predetermined speed according to the operation of the player until the image generation system determines that the placement of the puzzle block has been determined after the generated puzzle block has fallen in the display area in the same manner as in the process in the step S3. The image generation system repeatedly performs the process in the step S9 until the image generation system determines that the placement of the puzzle block has been determined.

When the image generation system has determined that the placement of the falling puzzle block has been determined, the image generation system performs the chain determination process of determining whether or not the specific pattern has been formed by the partial blocks included in the puzzle block of which the placement has been determined and the remaining block (step S10). Specifically, the image generation system determines whether or not a 3×3 partial block group has been formed in a portion differing from the portion in which the erasing target blocks have been set. For example, when the 3×3 partial block group partially includes the erasing target blocks, the image generation system determines that the 3×3 partial block group has been formed in a portion differing from the portion in which the erasing target blocks have been set.

When the image generation system has determined that the specific pattern has not been formed, the image generation system performs the erasing process of erasing the erasing target blocks (step S11), and transitions to the process in the step S2. In more detail, the image generation system erases the partial blocks positioned under the erasing target blocks in addition to the erasing target blocks, and cancels the connection of the puzzle block stacked over the erasing target objects and positions the disconnected partial blocks (causing the disconnected partial blocks to fall).

When the image generation system has determined that the specific pattern has been formed, the image generation system determines whether or not the disturbance block exists in the display area (step S12). When the image generation system has determined that the disturbance block does not exist in the display area, the image generation system transitions to a process in a step S13. When the image generation system has determined that the disturbance block exists in the display area, the image generation system transitions to a process in a step S14.

When the image generation system has determined that the disturbance block does not exist in the display area in the process in the step S12, the image generation system adds the partial blocks included in the 3×3 partial block group to the erasing target (step S13), and transitions to the process in the step S8.

When the image generation system has determined that the disturbance block exists in the display area in the process in the step S7 or S12, or when the image generation system has determined that the disturbance block still exists in the process in the step S17, the image generation system determines whether or not the disturbance block exists adjacent to each partial block forming the specific pattern (step S14).

When the image generation system has determined that the disturbance block exists adjacent to each partial block forming the specific pattern, the image generation system transitions to a process in a step S15. When the image generation system has determined that the disturbance block does not exist, the image generation system transitions to the process in the step S11.

When the image generation system has determined that the disturbance block exists adjacent to each partial block forming the specific pattern in the process in the step S14, the image generation system changes the disturbance block adjacent to the partial block into the normal block (step S15).

The image generation system then performs the chain redetermination process of determining whether or not the specific pattern has been formed based on the normal block into which the disturbance block has been changed and the remaining block (step S16). Specifically, the image generation system determines whether or not the specific pattern has been formed by the normal block into which the disturbance block has been changed and the remaining block (including the partial block set to be the erasing target block).

When the image generation system has determined that the specific pattern has not been formed, the image generation system transitions to the process in the step S8. When the image generation system has determined that the specific pattern has been formed, the image generation system adds the partial block included in the 3×3 shape to the erasing target object (step S17).

The image generation system then determines whether or not the disturbance block still exists in the display area (step S18). When the image generation system has determined that the disturbance block does not exist in the display area, the image generation system transitions to the process in the step S8. When the image generation system has determined that the disturbance block still exists in the display area, the image generation system transitions to the process in the step S14.

When the player does not play a match against another player (i.e. when the image generation system performs the game calculation process of a single-player mode and does not generate the disturbance block), the image generation system does not perform the processes in the steps S14 to S18, but performs the processes in the steps S8 to S13 without performing the processes from the step S7 to S12.

3.2 Game Calculation Process Using Time-Limit Chain Determination Process

Figure 15:
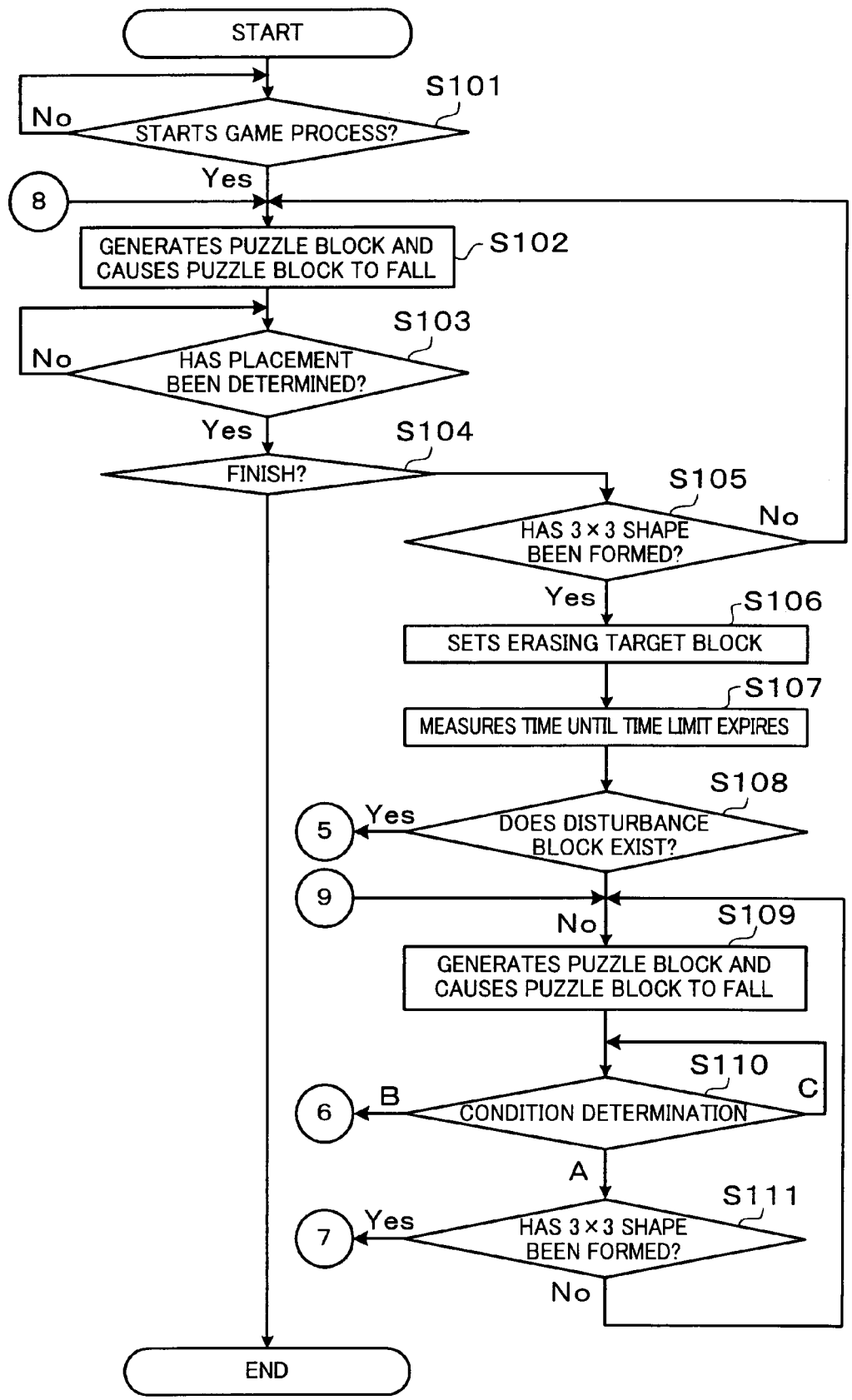
FIG. 15 is a flowchart showing a player-side game calculation process (time-limit chain determination process) of an image generation system according to one embodiment of the invention.
Figure 16:
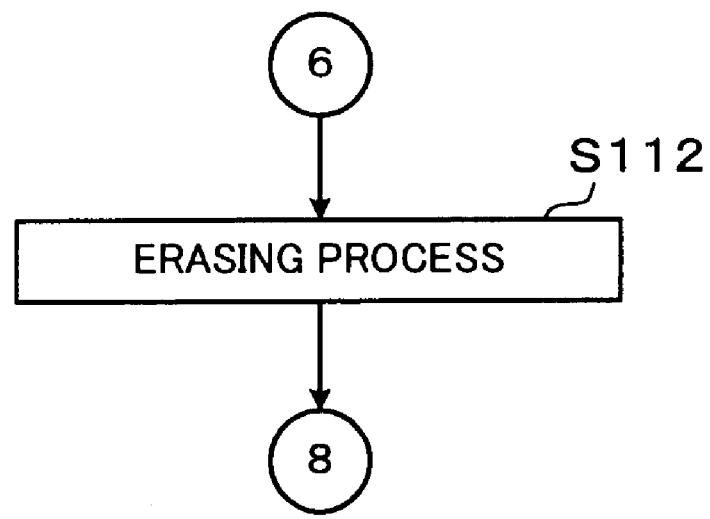
FIG. 16 is another flowchart showing a player-side game calculation process (time-limit chain determination process) of an image generation system according to one embodiment of the invention.
Figure 17:
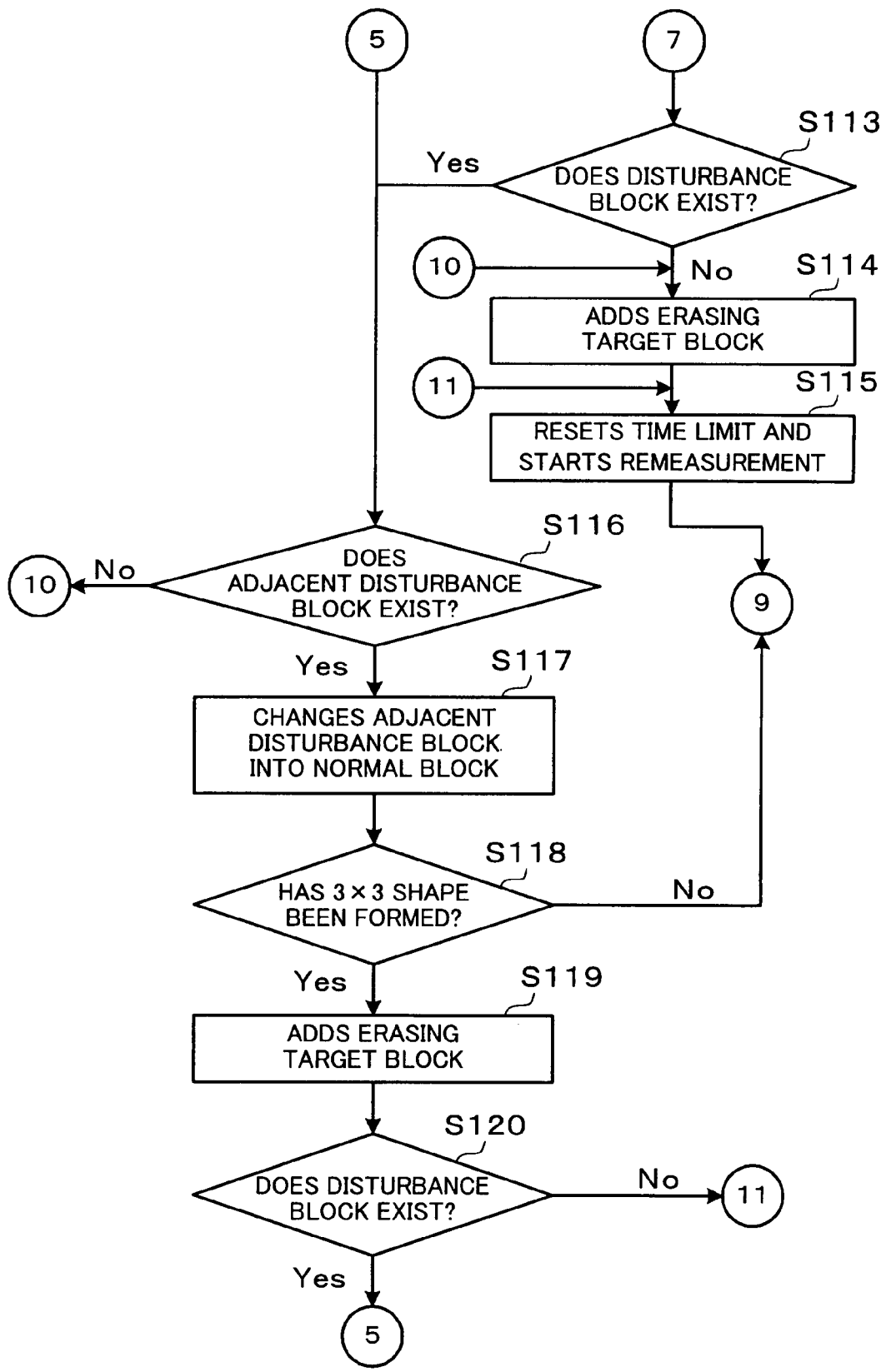
FIG. 17 is yet another flowchart showing a player-side game calculation process (time-limit chain determination process) of an image generation system according to one embodiment of the invention.

A detailed processing example of the game calculation process of the image generation system according to this embodiment when performing the time-limit chain determination process is described below with reference to FIGS. 15 to 17.

The following example illustrates the player-side game calculation process when the player plays a match with another player. FIGS. 15 to 17 are flowcharts showing the player-side game calculation process (time-limit chain determination process) of the image generation system according to this embodiment.

When the image generation system has started the game calculation process of a match game with another player (step S101), the image generation system generates a predetermined puzzle block at the top of the display area and causes the generated puzzle block to fall downward (step S102). When the generated puzzle block has started to fall, the image generation system starts to accept the operation input of the player relating to the movement, the rotation, and a change in speed of the puzzle block in the display area.

The image generation system determines whether or not the falling puzzle block has been positioned at the bottom of the display area or over the puzzle block which has been stacked and a predetermined period of time has elapsed (i.e. the placement of the puzzle block has been determined) (step S103).

The image generation system controls the puzzle block to fall in the display area at a predetermined speed according to the operation of the player until the image generation system determines that the placement of the puzzle block has been determined after the generated puzzle block has fallen in the display area. The image generation system repeatedly performs the process in the step S103 until the image generation system determines that the placement of the puzzle block has been determined.

When the image generation system has determined that the placement of the puzzle block has been determined, the image generation system determines whether or not the puzzle block is positioned in the puzzle block generation region of the display area (step S104).

Specifically, the image generation system determines whether or not to finish the game calculation process. The image generation system finishes the game calculation process when the puzzle block is positioned in the puzzle block generation region of the display area. When the puzzle block is not positioned in the puzzle block generation region, the image generation system transitions to a process in a step S105.

The image generation system then performs the specific pattern determination process based on the puzzle block of which the placement has been determined and the puzzle block stacked at the bottom of the display area (step S105). Specifically, the image generation system determines whether or not a 3×3 shape has been formed by the partial blocks.

When the image generation system has determined that the specific pattern has not been formed, the image generation system transitions to the process in the step S102. When the image generation system has determined that the specific pattern has been formed, the image generation system transitions to a process in a step S106.

The image generation system sets each partial block forming the specific pattern to be the erasing target block (step S106), and starts measuring the period of time until the time limit expires (step S107).

The image generation system determines whether or not the disturbance block exists in the display area (step S108). When the image generation system has determined that the disturbance block does not exist in the display area, the image generation system transitions to a process in a step S109. When the image generation system has determined that the disturbance block exists in the display area, the image generation system transitions to a process in a step S116.

The image generation system then generates a predetermined puzzle block at the top of the display area, and causes the generated puzzle block to fall downward (step S109). When the generated puzzle block has started to fall, the image generation system starts to accept the operation input of the player relating to the movement, the rotation, and a change in speed of the puzzle block in the display area in the same manner as in the process in the step S102.

The image generation system determines (A) whether or not the placement of the puzzle block has been determined, (B) whether or not the time limit has expired, or (C) whether or not these conditions have not been satisfied (step S110).

The image generation system controls the puzzle block to fall in the display area at a predetermined speed according to the operation of the player until the image generation system determines that the placement of the puzzle block has been determined after the generated puzzle block has fallen in the display area or the time limit has expired in the same manner as in the process in the step S103. The image generation system repeatedly performs the process in step S110 until the image generation system determines that the placement of the puzzle block has been determined or the time limit has expired.

When the image generation system has determined that (A) the placement of the puzzle block has been determined in the process in the step S110, the image generation system performs the chain determination process of determining whether or not the specific pattern has been formed based on the puzzle block of which the placement has been determined and the puzzle block stacked at the bottom of the display area (step S111). Specifically, the image generation system determines whether or not a 3×3 partial block group has been formed in a portion differing from the portion in which the erasing target blocks have been set. For example, when the 3×3 partial block group partially includes the erasing target blocks, the image generation system determines that the 3×3 partial block group has been formed in a portion differing from the portion in which the erasing target blocks have been set.

When the image generation system has determined that the specific pattern has not been formed, the image generation system transitions to the process in the step S109. When the image generation system has determined that the specific pattern has been formed, the image generation system transitions to a process in a step S113.

When the image generation system has determined that (B) the time limit has expired, the image generation system performs the erasing process of erasing the erasing target blocks (step S112), and transitions to the process in the S2. Specifically, the image generation system erases the partial blocks positioned under the erasing target blocks in addition to the erasing target blocks, cancels the connection of the puzzle block stacked over the erasing target objects, and positions the disconnected partial blocks (causes the disconnected partial blocks to fall).

When the image generation system has determined that the specific pattern has been formed in the process in the step S111, the image generation system determines whether or not the disturbance block exists in the display area (step S113). When the image generation system has determined that the disturbance block exists, the image generation system transitions to a process in a step S116.

When the image generation system has determined that the disturbance block does not exist in the display area, or when the image generation system has determined that the adjacent disturbance block does not exist in the process in the step S116, the image generation system adds the erasing target blocks (step S114). The image generation system resets the time limit, sets a new time limit, measures the period of time until the time limit expires (step S115), and transitions to the process in the step S109.

When setting the new time limit, the image generation system sets the time limit to be shorter than the previous time limit.

When the image generation system has determined that the disturbance block exists in the display area in the process in the step S108 or S113, or when the image generation system has determined that the disturbance block still exists in the process in the step S120, the image generation system determines whether or not the disturbance block exists which is adjacent to each partial block forming the specific pattern (step S116).

When the image generation system has determined that the disturbance block exists which is adjacent to each partial block forming the specific pattern, the image generation system transitions to a process in a step S117. When the image generation system has determined that the disturbance block does not exist, the image generation system transitions to the process in the step S114.

When the image generation system has determined that the disturbance block exists which is adjacent to each partial block forming the specific pattern in the process in the step S116, the image generation system changes the adjacent disturbance block into the normal block (step S117).

The image generation system then performs the chain redetermination process of determining whether or not the specific pattern has been formed based on the normal block into which the disturbance block has been changed and the remaining block (step S18). Specifically, the image generation system determines whether or not the specific pattern has been formed by the normal block and the remaining block (including the partial block set to be the erasing target block).

When the image generation system has determined that the specific pattern has not been formed, the image generation system transitions to the process in the step S109. When the image generation system has determined that the specific pattern has been formed, the image generation system adds the partial blocks included in the 3×3 specific pattern to the erasing target object (step S119).

The image generation system determines whether or not the disturbance block still exists in the display area (step S121). When the image generation system has determined that the disturbance block still exists in the display area, the image generation system transitions to the process in the step S116. When the image generation system has determined that the disturbance block does not exist, the image generation system transitions to the process in the step S115.

When the player does not play a match against another player (i.e. when the image generation system performs the game calculation process for a single player and does not generate the disturbance block), the image generation system does not perform the processes in the steps S113 to S120, but performs the process in the step S9 or S114 without performing the processes in the steps S108 to S113.

3.3 Disturbance Block Generation Process

Figure 18:
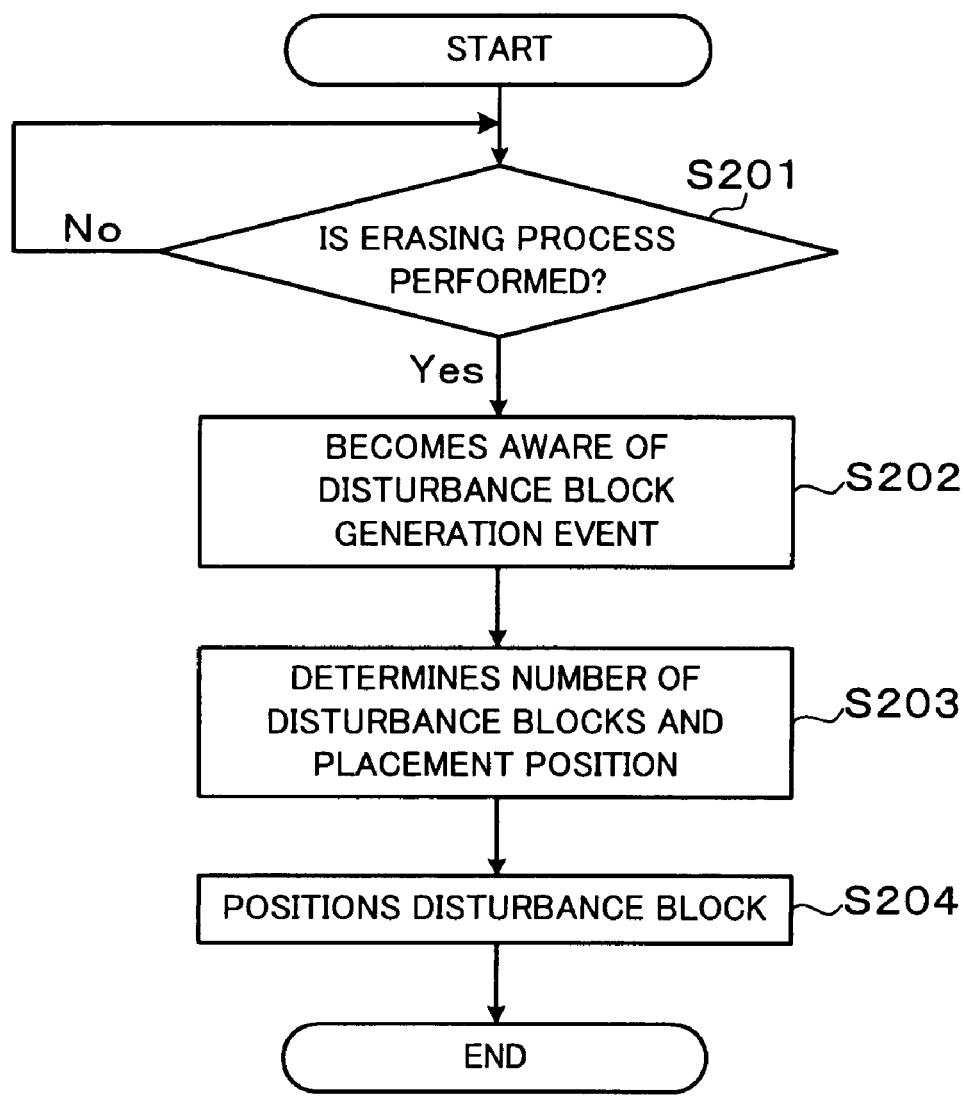
FIG. 18 is a flowchart showing a player-side disturbance block generation process of an image generation system according to one embodiment of the invention.

A detailed processing example of the disturbance block generation process of the image generation system according to this embodiment is described below with reference to FIG. 18.

The disturbance block generation process is performed during the above game calculation process. FIG. 18 is a flowchart showing the player-side disturbance block generation process of the image generation system according to this embodiment.

When another player has erased the erasing target blocks (step S201), the image generation system becomes aware of the disturbance block generation event (step S202).

The image generation system determines the number of disturbance blocks based on the number of blocks which have been erased by another player, the current game level, or the game progress time, and randomly determines the placement of the disturbance block (step S203).

The image generation system then positions the disturbance blocks in the determined number at the determined positions at a predetermined timing (step S204), and finishes the disturbance block generation process.

The invention is not limited to the above-described embodiments, and various modifications can be made. Any term cited with a different term having a broader meaning or the same meaning at least once in the specification or drawings can be replaced by the different term in any place in the specification and drawings.

The above embodiments have been described taking an example of a game system in which the connected object group is positioned in the game space and the object is independently erased in units of objects forming the connected object group. Note that the invention is not limited thereto.

For example, each object may be independently positioned in the game space, and the object may be independently erased in units of objects forming the connected object group.

Or, the connected object group may be integrally positioned in the game space, and the connected object group may be integrally erased.

The invention may be applied to various game systems such as an arcade game system, a consumer game system, a portable game system, a large-scale attraction system in which a number of players participate, a simulator, a multimedia terminal, a system board which generates a game image, and a portable telephone.

Although only some embodiments of the invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A non-transitory computer-readable information storage medium storing a program controlling a game system which controls placement of objects in a game space and erases at least part of the objects based on a placement pattern of the objects, the program causing a computer to function as:
   a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

2. A non-transitory computer-readable information storage medium storing a program controlling a game system which controls placement of objects in a game space and erases at least part of the objects based on a placement pattern of the objects, the program causing a computer to function as:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space within a predetermined period of time after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

3. The non-transitory computer-readable information storage medium as defined in claim 1, wherein the placement processing section integrally controls at least one of movement and rotation of connected object groups each of which is formed by connecting part of the objects based on the operation input of the player, and positions the objects forming the connected object groups in the game space.

4. The non-transitory computer-readable information storage medium as defined in claim 2, wherein the placement processing section integrally controls at least one of movement and rotation of connected object groups each of which is formed by connecting part of the objects based on the operation input of the player, and positions the objects forming the connected object groups in the game space.

5. The non-transitory computer-readable information storage medium as defined in claim 3, wherein the placement pattern determination section determines whether or not the objects including the connected object groups positioned in the game space form a predetermined placement pattern; and wherein the erasing processing section determines that the predetermined condition is not satisfied when the objects including additional connected object groups newly positioned in the game space after the erasing target objects have been set do not form a predetermined placement pattern.

6. The non-transitory computer-readable information storage medium as defined in claim 4, wherein the placement pattern determination section determines whether or not the objects including the connected object groups positioned in the game space form a predetermined placement pattern;

wherein the erasing processing section determines that the predetermined condition is satisfied when the objects including additional connected object groups newly positioned in the game space within a predetermined period of time after the erasing target objects have been set form a predetermined placement pattern; and wherein the erasing processing section determines that the predetermined condition is not satisfied when the objects including the additional connected object groups do not form the predetermined placement pattern.

7. The non-transitory computer-readable information storage medium as defined in claim 2, wherein, after the predetermined condition has been determined to be satisfied, the erasing processing section starts to measure another predetermined period of time which is determined by shortening the predetermined period of time, and determines again whether or not the predetermined condition is satisfied.

8. The non-transitory computer-readable information storage medium as defined in claim 7, wherein the erasing processing section shortens the predetermined period of time based on at least one of the number of times that the specific condition is satisfied, the number of times that the specific condition is successively satisfied, the number of the erasing target objects, a degree of difficulty of a game, and a period of time elapsed after starting the game.

9. The non-transitory computer-readable information storage medium as defined in claim 1, wherein the erasing processing section erases part of the objects having a predetermined positional relationship with the erasing target objects together with the erasing target objects, when performing the erasing process.

10. The non-transitory computer-readable information storage medium as defined in claim 2, wherein the erasing processing section erases part of the objects having a predetermined positional relationship with the erasing target objects together with the erasing target objects, when performing the erasing process.

11. The non-transitory computer-readable information storage medium as defined in claim 3, wherein the erasing processing section cancels a connection relationship of objects forming at least part of the connected object groups stacked over the erasing target objects in the game space, when performing the erasing process.

12. The non-transitory computer-readable information storage medium as defined in claim 4,
    wherein the erasing processing section cancels a connection relationship of objects forming at least part of the connected object groups stacked over the erasing target objects in the game space, when performing the erasing process.

13. The non-transitory computer-readable information storage medium as defined in claim 1,
    wherein the placement processing section generates and positions an inoperable object which cannot be operated by the player in the game space based on a predetermined event.

14. The non-transitory computer-readable information storage medium as defined in claim 2,
    wherein the placement processing section generates and positions an inoperable object which cannot be operated by the player in the game space based on a predetermined event.

15. The non-transitory computer-readable information storage medium as defined in claim 13,
    wherein the placement pattern determination section determines whether or not the objects positioned in the game space and including normal objects other than the inoperable object include objects forming a predetermined placement pattern.

16. The non-transitory computer-readable information storage medium as defined in claim 14,
    wherein the placement pattern determination section determines whether or not the objects positioned in the game space and including normal objects other than the inoperable object include objects forming a predetermined placement pattern.

17. The non-transitory computer-readable information storage medium as defined in claim 13, further causing the computer to function as:
    an object change section which changes the inoperable object having a predetermined positional relationship into a normal object when the predetermined condition is satisfied.

18. The non-transitory computer-readable information storage medium as defined in claim 14, further causing the computer to function as:
    an object change section which changes the inoperable object having a predetermined positional relationship into a normal object when the predetermined condition is satisfied.

19. The non-transitory computer-readable information storage medium as defined in claim 1,
    wherein, when the placement processing section controls rotation of an operation target object based on a positional relationship with other objects, the placement processing section rotatably controls the operation target object even if the operation target object interferes with other objects during rotation, as long as the operation target object after the rotation does not interfere with other objects.

20. The non-transitory computer-readable information storage medium as defined in claim 2,
    wherein, when the placement processing section controls rotation of an operation target object based on a positional relationship with other objects, the placement processing section rotatably controls the operation target object even if the operation target object interferes with other objects during rotation, as long as the operation target object after the rotation does not interfere with other objects.

21. The non-transitory computer-readable information storage medium as defined in claim 19, further causing the computer to function as:
    an object generation section which generates the connected object groups in each of which objects are connected to share only a vertex with each other in the game space so that the connected object groups can be operated by the player, when the game space is a two-dimensional space.

22. The non-transitory computer-readable information storage medium as defined in claim 20, further causing the computer to function as:
    an object generation section which generates the connected object groups in each of which objects are connected to share only a vertex with each other in the game space so that the connected object groups can be operated by the player, when the game space is a two-dimensional space.

23. The non-transitory computer-readable information storage medium as defined in claim 19, further causing the computer to function as:
    an object generation section which generates the connected object groups in each of which objects are connected to share only a side with each other in the game space so that the connected object groups can be operated by the player, when the game space is a three-dimensional space.

24. The non-transitory computer-readable information storage medium as defined in claim 20, further causing the computer to function as:
    an object generation section which generates the connected object groups in each of which objects are connected to share only a side with each other in the game space so that the connected object groups can be operated by the player, when the game space is a three-dimensional space.

25. An image generation system for a game system which controls placement of objects in a game space and erases at least part of the objects based on a placement pattern of the objects, the image generation system comprising:
    a placement processing section controlling at least one of movement and rotation of the objects based on an operation input of a player and positioning the objects in the game space;
    a placement pattern determination section determining whether or not the objects positioned in the game space includes objects forming a predetermined placement pattern;
    an erasing target object setting section setting the objects forming a predetermined placement pattern as erasing target objects; and
    an erasing processing section performing an erasing process which includes determining whether or not a predetermined condition is satisfied after the erasing target objects have been set, and erasing the erasing target objects from the game space when the predetermined condition is determined not to be satisfied,
    the placement pattern determination section determining whether or not the objects including additional objects newly positioned in the game space after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

26. An image generation system for a game system which controls placement of objects in a game space and erases at least part of the objects based on a placement pattern of the objects, the image generation system comprising:

a placement processing section controlling at least one of movement and rotation of the objects based on an operation input of a player and positioning the objects in the game space;

a placement pattern determination section determining whether or not the objects positioned in the game space includes objects forming a predetermined placement pattern;

an erasing target object setting section setting the objects forming a predetermined placement pattern as erasing target objects; and an erasing processing section performing an erasing process which includes determining whether or not a predetermined condition is satisfied after the erasing target objects have been set, and erasing the erasing target objects from the game space when the predetermined condition is determined not to be satisfied, the placement pattern determination section determining whether or not the objects including additional objects newly positioned in the game space within a predetermined period of time after the erasing target objects have been set include objects forming a predetermined placement pattern, the erasing processing section determining that the predetermined condition is satisfied when the objects forming a predetermined placement pattern are determined to be included, and the erasing processing section determining that the predetermined condition is not satisfied when the objects forming a predetermined placement pattern are determined not to be included.

* * * * *